(12) United States Patent  (10) Patent No.: US 8,169,744 B2
Dorius  (45) Date of Patent: May 1, 2012

(54) SLIDER HAVING A LUBRICANT-ACCUMULATION BARRIER

(75) Inventor: Lee K. Dorius, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 747 days.

(21) Appl. No.: 12/324,624

(22) Filed: Nov. 26, 2008

(65) Prior Publication Data

US 2010/0128395 A1    May 27, 2010

(51) Int. Cl.
G11B 5/60 (2006.01)
G11B 15/64 (2006.01)

(52) U.S. Cl. ............... 360/235.1; 360/235.4; 360/235.5; 360/235.6; 360/235.7; 360/235.8; 360/235.9; 360/236.4; 360/236.5

(58) Field of Classification Search ............... 360/235.1, 360/235.4, 235.5, 235.6, 235.7, 235.8, 235.9, 360/236.4, 236.5
See application file for complete search history.

(56) References Cited

U.S. PATENT DOCUMENTS

| | | | | |
|---|---|---|---|---|
| 5,162,073 A * | 11/1992 | Aronoff et al. | ............... | 216/101 |
| 5,220,470 A * | 6/1993 | Ananth et al. | ............. | 360/235.6 |
| 5,853,959 A * | 12/1998 | Brand et al. | ............. | 430/320 |
| 6,004,472 A * | 12/1999 | Dorius et al. | ............. | 216/22 |
| 6,055,127 A * | 4/2000 | Boutaghou et al. | ............. | 360/236 |
| 6,120,694 A * | 9/2000 | Kasamatsu et al. | ............. | 216/22 |
| 6,212,033 B1 * | 4/2001 | Sasaki | ............. | 360/230 |
| 6,396,663 B1 * | 5/2002 | Kasamatsu | ............. | 360/235.8 |
| 6,441,999 B1 * | 8/2002 | Tang et al. | ............. | 360/236.6 |
| 6,498,701 B1 * | 12/2002 | Berg | ............. | 360/235.4 |
| 6,504,682 B1 * | 1/2003 | Sannino et al. | ............. | 360/235.8 |
| 6,552,871 B2 * | 4/2003 | Suzuki et al. | ............. | 360/97.01 |
| 6,594,113 B2 * | 7/2003 | Rao et al. | ............. | 360/235.8 |
| 6,603,639 B1 * | 8/2003 | Polycarpou et al. | ............. | 360/235.8 |
| 6,683,754 B2 * | 1/2004 | Suzuki et al. | ............. | 360/235.5 |
| 6,747,847 B2 * | 6/2004 | Stoebe et al. | ............. | 360/235.8 |
| 6,927,942 B2 * | 8/2005 | Tani et al. | ............. | 360/235.6 |
| 6,961,217 B2 * | 11/2005 | Kameyama et al. | ............. | 360/235.6 |
| 7,023,664 B2 * | 4/2006 | Crone et al. | ............. | 360/235.7 |
| 7,054,108 B2 * | 5/2006 | Boutaghou et al. | ............. | 360/236.5 |
| 7,130,154 B2 * | 10/2006 | Otsuka et al. | ............. | 360/237 |
| 7,227,723 B2 * | 6/2007 | Nath et al. | ............. | 360/235.7 |
| 7,282,833 B2 * | 10/2007 | Kim et al. | ............. | 310/268 |
| 7,333,297 B2 * | 2/2008 | Park | ............. | 360/235.5 |
| 7,352,531 B2 | 4/2008 | Kameyama | | |
| 7,502,202 B2 * | 3/2009 | Takahashi | ............. | 360/236.3 |
| 7,515,384 B2 * | 4/2009 | Huang | ............. | 360/235.6 |
| 7,679,863 B2 * | 3/2010 | Hashimoto et al. | ............. | 360/235.7 |
| 7,719,794 B2 * | 5/2010 | Hanyu et al. | ............. | 360/235.6 |
| 7,872,833 B2 * | 1/2011 | Hu et al. | ............. | 360/236.1 |
| 7,903,375 B2 * | 3/2011 | Knigge et al. | ............. | 360/235.7 |
| 7,961,433 B2 * | 6/2011 | Zheng et al. | ............. | 360/236.5 |
| 2003/0189794 A1 | 10/2003 | Kameyama et al. | | |

* cited by examiner

*Primary Examiner* — Viet Q Nguyen

(57) ABSTRACT

A slider resistant to lubricant accumulation. The slider resistant to lubricant accumulation includes a positive-air-pressure portion of the slider configured to levitate the slider above a magnetic-recording disk and a negative-air-pressure portion of the slider configured to bring the slider into proximity with the magnetic-recording disk at a fly height sufficient for writing data to and reading data from the magnetic-recording disk. The slider resistant to lubricant accumulation also includes a lubricant-accumulation barrier disposed in proximity to a trailing edge of the slider. The lubricant-accumulation barrier is configured to reduce lubricant accumulation on the slider.

21 Claims, 16 Drawing Sheets

US 8,169,744 B2

SLIDER HAVING A LUBRICANT-ACCUMULATION BARRIER

TECHNICAL FIELD

Embodiments of the present invention relate to the field of hard-disk-drives.

BACKGROUND

The magnetic-recording, hard-disk-drive (HDD) industry is extremely competitive. The demands of the market for ever increasing storage capacity, storage speed, and other enhancement features compounded with the desire for low cost creates tremendous pressure for manufacturing economies and improved reliability. Therefore, reliability improvements and associated cost savings that can be found attract significant attention on the part of engineers assigned the task of developing and manufacturing these complex devices.

One area of the manufacturing process where considerable economies can be made is in the reduction of the number of parts used in the HDD through the implementation of commonality in design. Therefore, engineers are constantly striving to find designs both to reduce the number of parts through commonality, and the attending assembly costs associated with those parts, and to improve the reliability of the assembled HDD. Therefore, lowering the cost of HDDs and improving the reliability of HDDs through innovations directed towards common designs across HDD platforms and improved reliability are of paramount importance for maintaining a competitive edge in the HDD manufacturing business.

SUMMARY

Embodiments of the present invention include a slider resistant to lubricant accumulation. The slider resistant to lubricant accumulation includes a positive-air-pressure portion of the slider configured to levitate the slider above a magnetic-recording disk and a negative-air-pressure portion of the slider configured to bring the slider into proximity with the magnetic-recording disk at a fly height sufficient for writing data to and reading data from the magnetic-recording disk. The slider resistant to lubricant accumulation also includes a lubricant-accumulation barrier disposed in proximity to a trailing edge of the slider. The lubricant-accumulation barrier is configured to reduce lubricant accumulation on the slider.

DESCRIPTION OF THE DRAWINGS

The accompanying drawings, which are incorporated in and form a part of this specification, illustrate embodiments of the invention and, together with the description, serve to explain the embodiments of the invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

Figure 1:
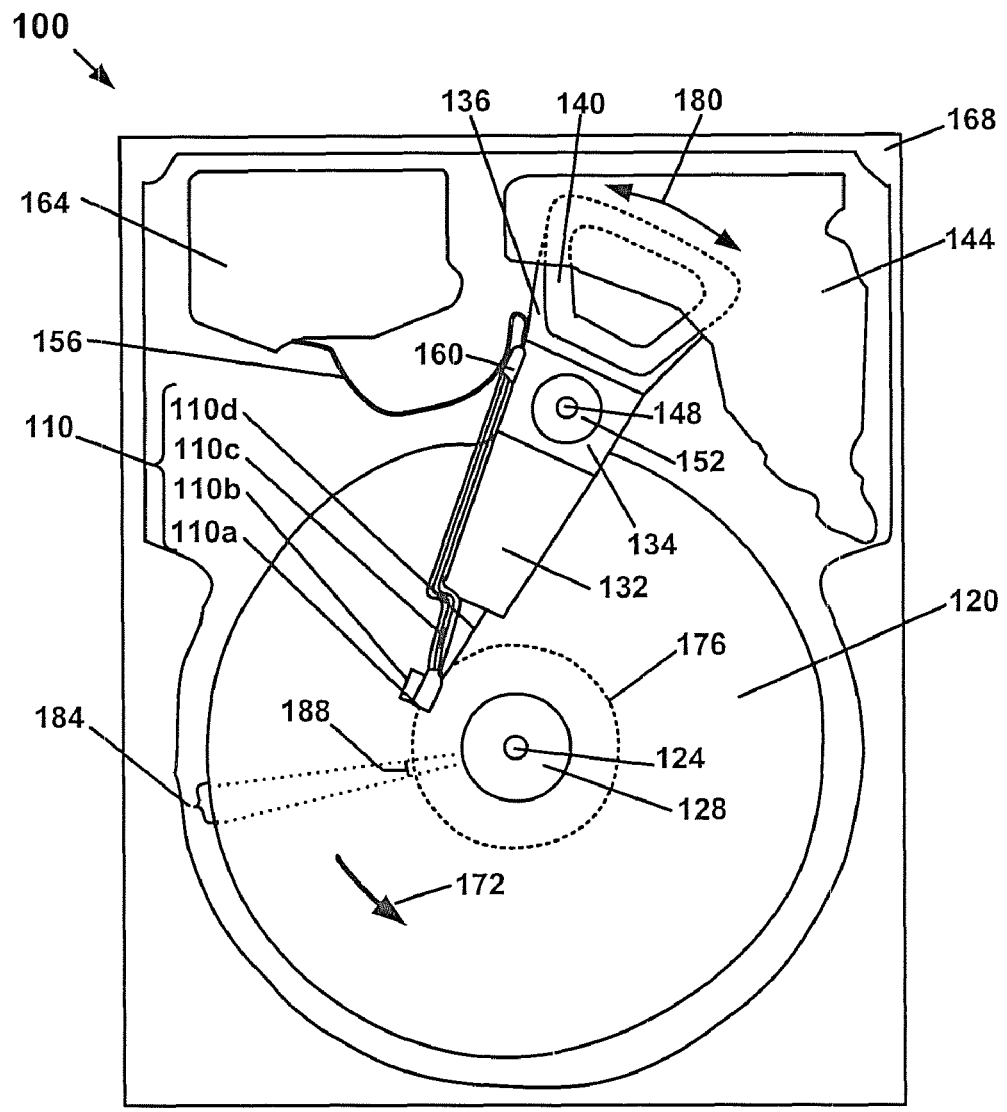
FIG. 1 is a plan view of a hard-disk drive (HDD) illustrating the functional arrangement of components of the HDD including a slider including a lubricant-accumulation barrier in accordance with an embodiment of the present invention.

Physical Description of Embodiments of the Present Invention for a Slider Having a Lubricant-Accumulation Barrier With reference to FIG. 1, in accordance with an embodiment of the present invention, a plan view of a HDD 100 is shown. FIG. 1 illustrates the functional arrangement of a slider resistant to lubricant accumulation including a lubricant-accumulation barrier (see FIGS. 4A, 5A, 6A, 7A and 8A and description thereof) with respect to other components of the HDD 100. The HDD 100 includes at least one HGA 110 including a magnetic-recording head 110a, a lead suspension 110c attached to the magnetic-recording head 110a, and a load beam 110d attached to a slider 110b, which includes the magnetic-recording head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the magnetic-recording disk 120. The magnetic-recording head 110a includes a write element, a so-called writer, and a read element, a so-called reader, for respectively writing and reading information stored on the magnetic-recording disk 120 of the HDD 100. The magnetic-recording disk 120 or a plurality (not shown) of magnetic-recording disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the magnetic-recording disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the magnetic-recording head 110a, are provided by a flexible cable 156. Interconnection between the flexible cable 156 and the magnetic-recording head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the magnetic-recording head 110a of the HGA 110. The electrical signal provided to the drive motor enables the drive motor to spin providing a torque to the spindle 124 which is in turn transmitted to the magnetic-recording disk 120 that is affixed to the spindle 124 by the disk clamp 128; as a result, the magnetic-recording disk 120 spins in a direction 172. The spinning magnetic-recording disk 120 creates a cushion of air that acts as an air-bearing on which the air-bearing surface (ABS) of the slider 110b rides so that the slider 110b flies above the surface of the magnetic-recording disk 120 without making contact with a thin magnetic-recording medium of the magnetic-recording disk 120 in which information is recorded. The electrical signal provided to the voice coil 140 of the VCM enables the magnetic-recording head 110a of the HGA 110 to access a track 176 on which information is recorded. Thus, the armature 136 of the VCM swings through an arc 180 which enables the HGA 110 attached to the armature 136 by the arm 132 to access various tracks on the magnetic-recording disk 120. Information is stored on the magnetic-recording disk 120 in a plurality of concentric tracks (not shown) arranged in sectors on the magnetic-recording disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the magnetic-recording head 110*a* of the HGA 110 reads the servo-burst-signal pattern which provides a position-error-signal (PES) to the servo electronics, which controls the electrical signal provided to the voice coil 140 of the VCM, enabling the magnetic-recording head 110*a* to follow the track 176. Upon finding the track 176 and identifying a particular sectored track portion 188, the magnetic-recording head 110*a* either reads data from the track 176 or writes data to the track 176 depending on instructions received by the disk controller from an external agent, for example, a microprocessor of a computer system.

Embodiments of the present invention also encompass a HDD 100 that includes the HGA 110, the magnetic-recording disk 120 rotatably mounted on the spindle 124, the arm 132 attached to the HGA 110 including the slider 110*b* resistant to lubricant accumulation including a lubricant-accumulation barrier (see FIGS. 4A, 5A, 6A, 7A and 8A and description thereof). Therefore, embodiments of the present invention incorporate within the environment of the HDD 100, without limitation, the subsequently described embodiments of the present invention for the slider 110*b* resistant to lubricant accumulation including the lubricant-accumulation barrier as further described in the following discussion. Similarly, embodiments of the present invention incorporate within the environment of the HGA 110, without limitation, the subsequently described embodiments of the present invention for the slider 110*b* resistant to lubricant accumulation including the lubricant-accumulation barrier as further described in the following discussion.

Figure 2:
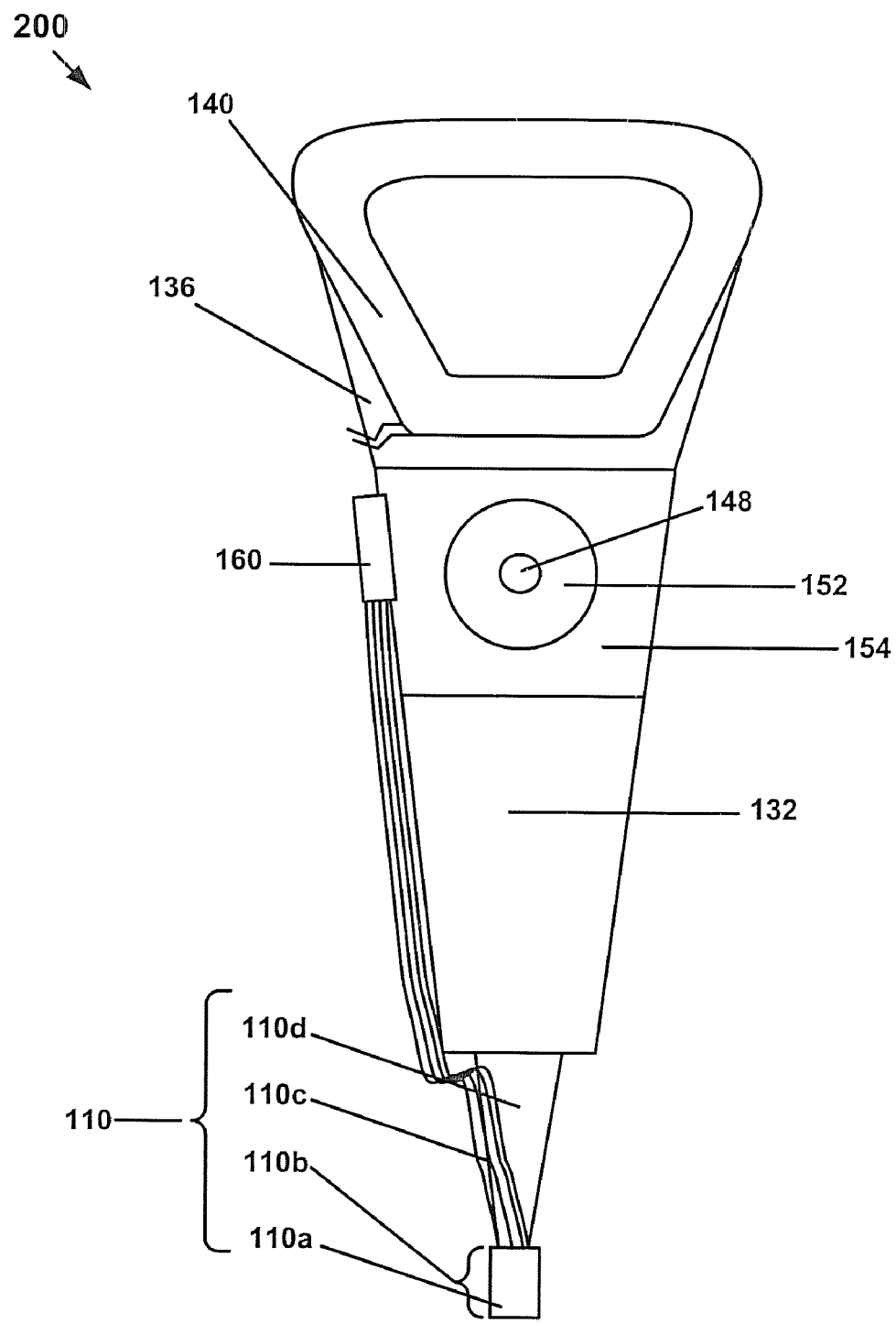
FIG. 2 is a plan view of a head-arm-assembly (HAA) including a head-gimbal assembly (HGA) illustrating the functional arrangement of components of the HAA and HGA with respect to a slider including a lubricant-accumulation barrier in accordance with an embodiment of the present invention.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110*b* resistant to lubricant accumulation including a lubricant-accumulation barrier (see FIGS. 4A, 5A, 6A, 7A and 8A and description thereof). The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted of the pivot-shaft 148 with the interposed pivot-bearing assembly 152. The slider 110*b* resistant to lubricant accumulation including a lubricant-accumulation barrier and incorporating the magnetic-recording head 110*a* is subsequently described in greater detail in FIGS. 4A, 5A, 6A, 7A and 8A.

Figure 3A:
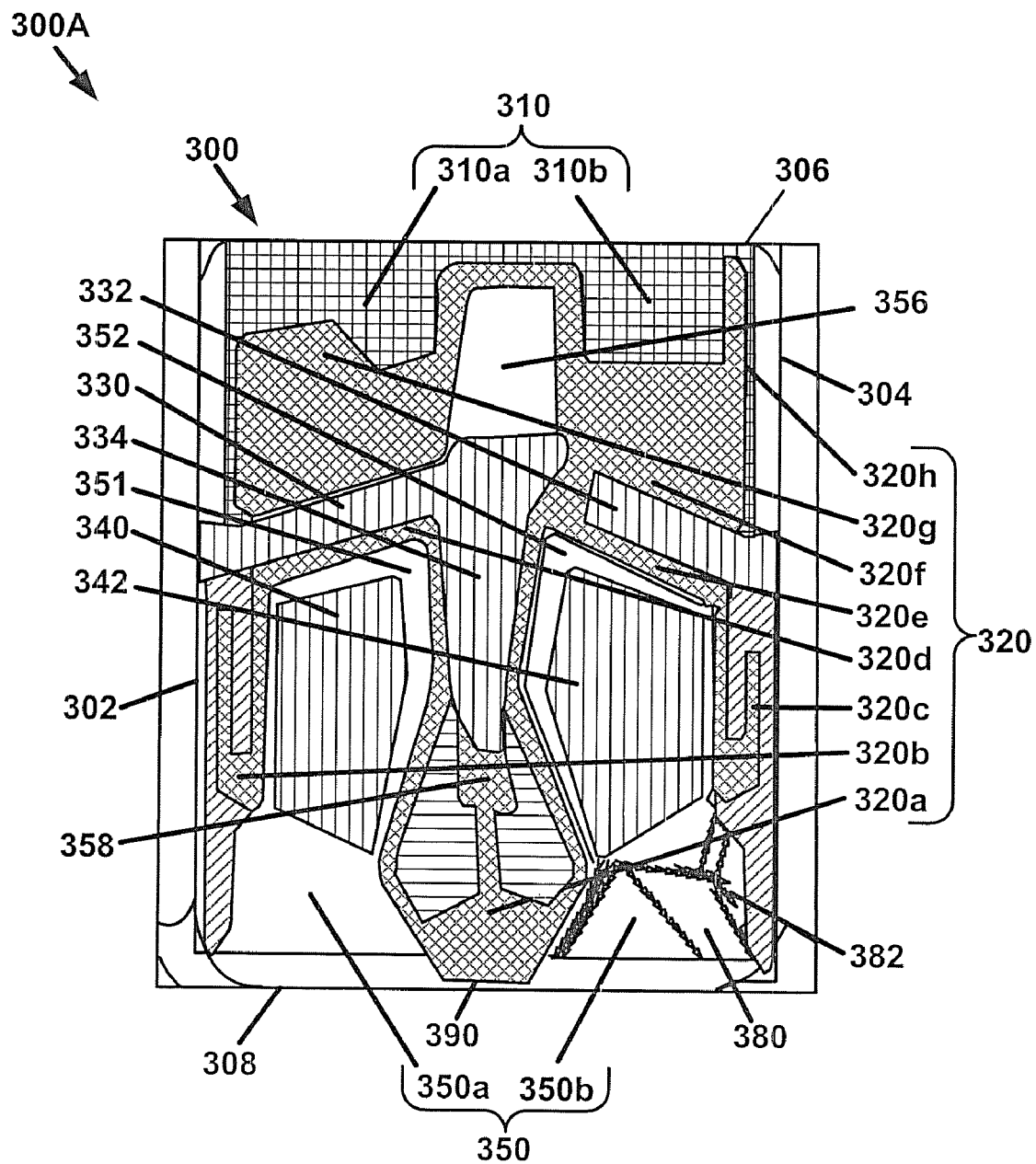
FIG. 3A is a photograph of a disk-facing side of a slider that shows lubricant accumulation at a shallow, trailing-edge (TE), outside-diameter (OD) etch pocket on the disk-facing slider-surface after flying the slider over a magnetic-recording disk.

With reference now to FIG. 3A, in order to more fully understand the utility of embodiments of the present invention, a photograph 300A of a disk-facing side of a slider 300 is shown. For the photograph 300A shown in FIG. 3A, the photograph 300A of the slider 300 is as it would appear having been turned over for inspection purposes. FIG. 3A shows a lubricant accumulation 380 on a shallow, trailing-edge (TE), outside-diameter (OD) etch pocket 350*b* of a disk-facing slider-surface that faces a magnetic-recording disk, for example, magnetic-recording disk 100 of FIG. 1, after the slider 300 has been flown over the magnetic-recording disk (not shown). The slider 300 has the shape of a substantially rectangular parallelepiped; as used herein, with respect to various sliders and slider designs subsequently described, the term "substantially rectangular" means that a slider has the shape of a rectangular box such that opposite sides of the box are about parallel to one another within manufacturing tolerances and specifications for fabricating the slider, without limitation, including any air-bearing surfaces, channels, etch pockets, overcoats or other structures present on a disk-facing slider-surface of a slider. The slider 300 includes six sides: a side facing an inside diameter (ID) of a magnetic-recording disk, for example, similar to the magnetic-recording disk 120, referred to herein as an ID side 302; a side facing an outside diameter of the magnetic-recoding disk, an OD side 304; a side at a leading edge of the slider 300 facing into the direction 172 of motion of the magnetic-recording disk, a leading-edge (LE) side 306; a side at a trailing edge of the slider 300 facing away from the direction 172 of motion of the magnetic-recording disk, a TE side 308; a side facing the gimbal attachment at the end of the load beam 110*d*, a gimbal-facing side (not shown); and, a side facing the magnetic-recording disk, a disk-facing side. As shown in FIG. 3A, the slider 300 is for a downward-facing slider, which faces an upward-facing side of a disk, relative to the configuration of the slider 110*b* and the magnetic-recording disk 120 shown in FIG. 1, which displays the upward-facing side of the disk 120. For a corresponding upward-facing slider, which faces a downward-facing side of a disk, relative to the magnetic-recording disk 120 shown in FIG. 1, the configuration of the upward-facing slider topography would be a mirror-image reflection of that shown in FIG. 3A across a plane parallel to the OD side 304 of the downward-facing slider, identified with the slider 300. Because the configuration of the upward-facing slider topography is the mirror-image reflection of that shown in FIG. 3A, the appearance of the upward-facing slider with the disk-facing side of the upward-facing slider facing up and the TE at the bottom of the figure would be such that the OD side of the upward-facing slider would be on the left-hand side of the upward-facing slider rather than the right-hand side, as shown for the downward-facing slider displayed in FIG. 3A, and the ID side of the upward-facing slider would appear on the right-hand side of the upward-facing slider rather than the left-hand side, as shown for the downward-facing slider of FIG. 3A. As used herein, the terms "upward-facing" and "downward-facing" as applied to a slider and a disk are used relative to the presentation of the HDD 100 in FIG. 1. Therefore, the use of the terms "upward-facing" and "downward-facing" as applied to a slider and a disk do not imply an absolute orientation of a slider or a disk, as the HDD can be mounted in virtually any orientation. Consequently, embodiments of the present invention that are subsequently described apply equally well to both "upward-facing" and "downward-facing" sliders when allowance has been made for the change in the location of topographical features due to the mirror-image reflection. As used herein, the term of art "inside-diameter" refers to a structure closer to the ID side 302 than the OD side 304; the term of art "outside-diameter" refers to a structure closer to the OD side 304 than the ID side 302; the term of art "leading-edge" refers to a structure closer to the LE side 306 than the TE side 308; and, the term of art "trailing-edge" refers to a structure closer to the TE side 308 than the LE side 306. The disk-facing side includes a disk-facing slider-surface fabricated with a surface topography designed to facilitate flight of the slider 300 over the surface of the magnetic-recording disk.

With further reference to FIG. 3A, the disk-facing slider-surface includes the following portions: a shallow, LE recess 310; an air-bearing surface (ABS) 320, shown in superimposed cross-hatching, not of the original photograph, highlighting location of the ABS 320; a deep, ID channel 330; a deep, OD channel 332; a deep, central channel 334; a deep, ID etch pocket 340; a deep, OD etch pocket 342; shallow, TE etch pockets 350; a shallow, ID etch pocket 351; a shallow, OD etch pocket 352; a shallow, central LE etch pocket 356; and, a shallow, central TE etch pocket 358. A positive-air-pressure portion of the slider 300 includes the ABS 320; the ABS 320 may further include: a TE center pad 320a; a TE ID rail 320b; a TE OD rail 320c; an ID, ABS-connecting portion 320d; an OD, ABS-connecting portion 320e; a LE OD pad 320f; a LE ID pad 320g; and, a LE OD rail 320h. A portion of the LE ID pad 320g may include a LE ID-rail portion; and, a portion of the LE OD pad 320f may include a LE OD-rail portion. The positive-air-pressure portion of the slider 300 generates a positive air pressure that creates a fluid-dynamic air-bearing that serves to levitate the slider 300 over a rotating magnetic-recording disk, for example, similar to the magnetic-recording disk 120, during operation of the HDD, for example, similar to HDD 100.

With further reference to FIG. 3A, a negative-air-pressure portion of the slider 300 may include the following portions: the deep, ID channel 330; the deep, OD channel 332; the deep, central channel 334; the deep, ID etch pocket 340; the deep, OD etch pocket 342; the shallow, TE etch pockets 350; the shallow, ID etch pocket 351; the shallow, OD etch pocket 352; the shallow, central LE etch pocket 356; and, the shallow, central TE etch pocket 358. The shallow, TE etch pockets 350 may further include a shallow, TE ID etch pocket 350a and a shallow, TE OD etch pocket 350b. The shallow, LE recess 310 may further include a shallow, LE ID recess 310a and a shallow, LE OD recess 310b. The negative-air-pressure portion generates a negative air pressure that serves to bring the slider 300 into close proximity of the surface of the rotating magnetic-recording disk during operation of the HDD. The balance of forces resulting from the positive air pressure generated by the positive-air-pressure portion, the negative air pressure generated by the negative-air-pressure portion, and the "gram load," a term of art referring to the spring force exerted by the load beam 110d attached to the slider 110b, which may be identified with slider 300, cause the slider 300 to fly over the disk at a controlled distance, referred to by the term of art "fly height," over the disk. This balance of forces serves to position magnetic-recording head 390, for example, similar to the magnetic-recording head 110a of FIGS. 1 and 2, in a communicating relationship with the magnetic-recording disk for writing data to and reading data from the magnetic-recording disk. To write data to and read data from the magnetic-recording disk, the fly height of the slider 300 is about 10 nanometers (nm), or less, at the location of the magnetic-recording head 390 at the TE of the slider 300. Sliders having current slider designs are called "tail-draggers," a term of art that indicates that the LE fly height is greater than the TE fly height; for example, for the slider 300, the LE fly height was about 100 nm; and, the TE fly height was about 10 nm. As areal recording densities increase, it is expected that fly height will be reduced according to a scaling law analogous to Moore's Law of integrated circuit (IC) technology. The accurate control of fly height is essential for maintaining good write characteristics and good read characteristics of the magnetic-recording head 390, because the magnetic fields associated with the generation of a read signal from and a write signal to the magnetic-recording disk depend sensitively on the fly height.

With further reference to FIG. 3A, a significant amount of lubricant accumulation 380 is indicated by the darkened region within the heavy dashed lines on the shallow, TE OD etch pocket 350b. Lubricant accumulation 380 may become a significant detractor of good write characteristics and good read characteristics of the magnetic-recording head 390. The deleterious effects of lubricant accumulation can manifest themselves in a variety of ways; by an increase in the soft-error rate (SER) for reading data recorded on a magnetic-recording disk; by an oscillation in read-signal strength coming from a magnetic-recording disk, referred to by the term of art "jammy;" and, by dead periods when the read element of the magnetic-recording head 390 is completely unresponsive to read-signals generated by a magnetic-recording disk. Embodiments of the present invention are useful for reducing lubricant accumulation 380, and for mitigating the deleterious effects of lubricant accumulation manifesting themselves in anomalous write characteristics and read characteristics of the magnetic-recording head 390. Based on detailed simulations performed by the inventor of airflow patterns between the slider 300 and a magnetic-recording disk, the inventor has found that such lubricant accumulation is associated with a boundary 382 between positive airflow, generated by a positive-air-pressure portion of the slider 300 and a rotating surface of a magnetic-recording disk, and reverse airflow, produced by a negative-air-pressure portion of the slider 300. Based on these airflow simulations, the inventor has found that reverse airflow on the OD side 304 at the shallow, TE OD etch pocket 350b correlates to lubricant accumulation 380. However, a lubricant accumulation associated with reverse airflow on the ID side 302 at the shallow, TE ID etch pocket 350a was not apparent in the photograph 300A of the disk-facing side of the slider 300.

Figure 3B:
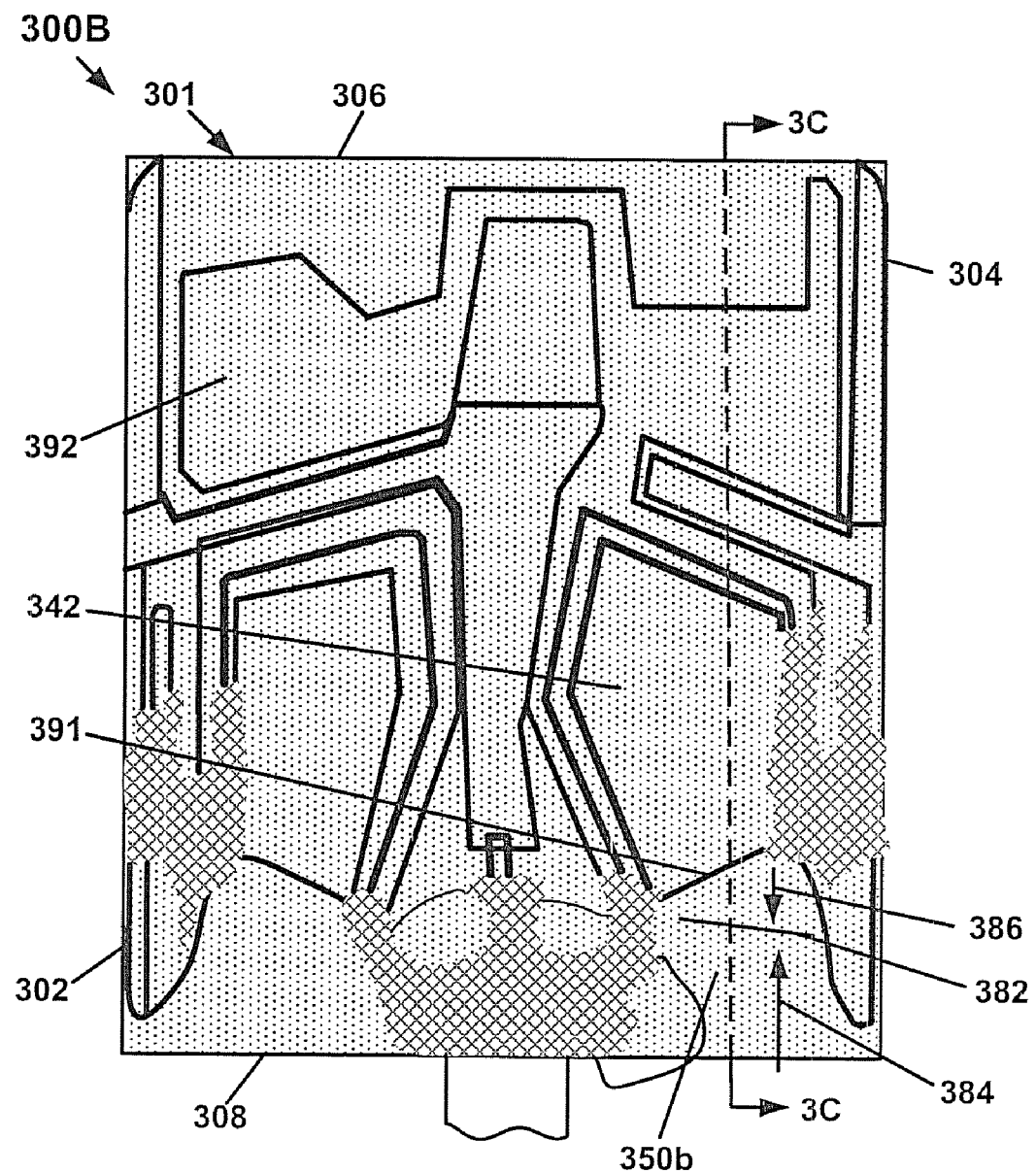
FIG. 3B is a vector-flow diagram superimposed on a topographical map of the slider of FIG. 3A that is used to model an airflow pattern adjacent to the disk-facing slider-surface in the simulation of airflow conditions that lead to lubricant accumulation at the shallow, TE OD etch pocket on the disk-facing slider-surface.

With reference now to FIG. 3B, again in order to more fully understand the utility of embodiments of the present invention, a vector-flow diagram 300B of airflow superimposed on a topographical map 301 of the disk-facing slider-surface of the slider 300 of FIG. 3A is shown. FIG. 3B shows the results of modeling an airflow pattern adjacent to the disk-facing slider-surface of the slider 300 of FIG. 3A. The model simulates airflow conditions that lead to lubricant accumulation 380 on the shallow, TE OD etch pocket 350b of the disk-facing slider-surface. The direction 386 of positive airflow is directed from the LE side 306 to the TE side 308 of the slider 300. The direction 384 of reverse airflow is directed from the TE side 308 to the LE side 306. The ID side 302 and OD side 304 are also indicated on the topographical map 301 of the disk-facing slider-surface. Side-walls between portions of the disk-facing slider-surface, which have relatively constant depth below the ABS 320 of the slider 300, are indicated by the heavy dark lines, of which side-wall 391 between the deep, OD etch pocket 342 and shallow, TE OD etch pocket 350b is but one example.

With further reference to FIG. 3B, the direction of airflow at a given point in close proximity to the disk-facing slider-surface is given by each arrow-head of an airflow vector of a plurality of arrow-heads of associated airflow vectors shown in FIG. 3B, of which arrow-head 392 is but one example. The boundary 382 between positive airflow and reverse airflow is seen to coincide with a reversal of the direction of airflow as indicated by the arrow-heads of the airflow vectors in proximity to the boundary 382 and by the arrows corresponding to direction 386 of positive airflow and the direction 384 of reverse airflow, as shown in FIG. 3B. As discussed above, the inventor found that lubricant accumulation 380 was correlated with the boundary 382. The vector-flow diagram 300B of airflow superimposed on the topographical map 301 of the disk-facing slider-surface gives a fairly good representation of airflow in proximity to the disk-facing slider-surface in the two dimensions of the disk-facing side of the slider 300. These two dimensions are determined by the direction 386 of a vector directed from the LE side 306 to the TE side 308 and a vector orthogonal to the direction 386 directed from the ID side 302 to the OD side 304, which lie in the plane of FIG. 3B.

However, this two-dimensional (2D) representation of the airflow does not fully describe the airflow pattern between the disk-facing slider-surface and the surface of a rotating magnetic-recording disk, because a two-dimensional (2D) representation of the airflow lacks information about the airflow pattern in a third dimension perpendicular to the disk-facing side. Line 3C-3C indicates a trace of a cutting plane perpendicular to the disk-facing side corresponding to a vertical slice in a vertical air-column between the disk-facing slider-surface of the slider 300 of FIG. 3A over the topographical map 301 of the slider 300. The inventor simulated an airflow pattern in the vertical air-column between the disk-facing slider-surface of the vertical slice along line 3C-3C to obtain information about the airflow pattern in the third dimension perpendicular to the disk-facing side of the slider 300, which is next described.

Figure 3C:
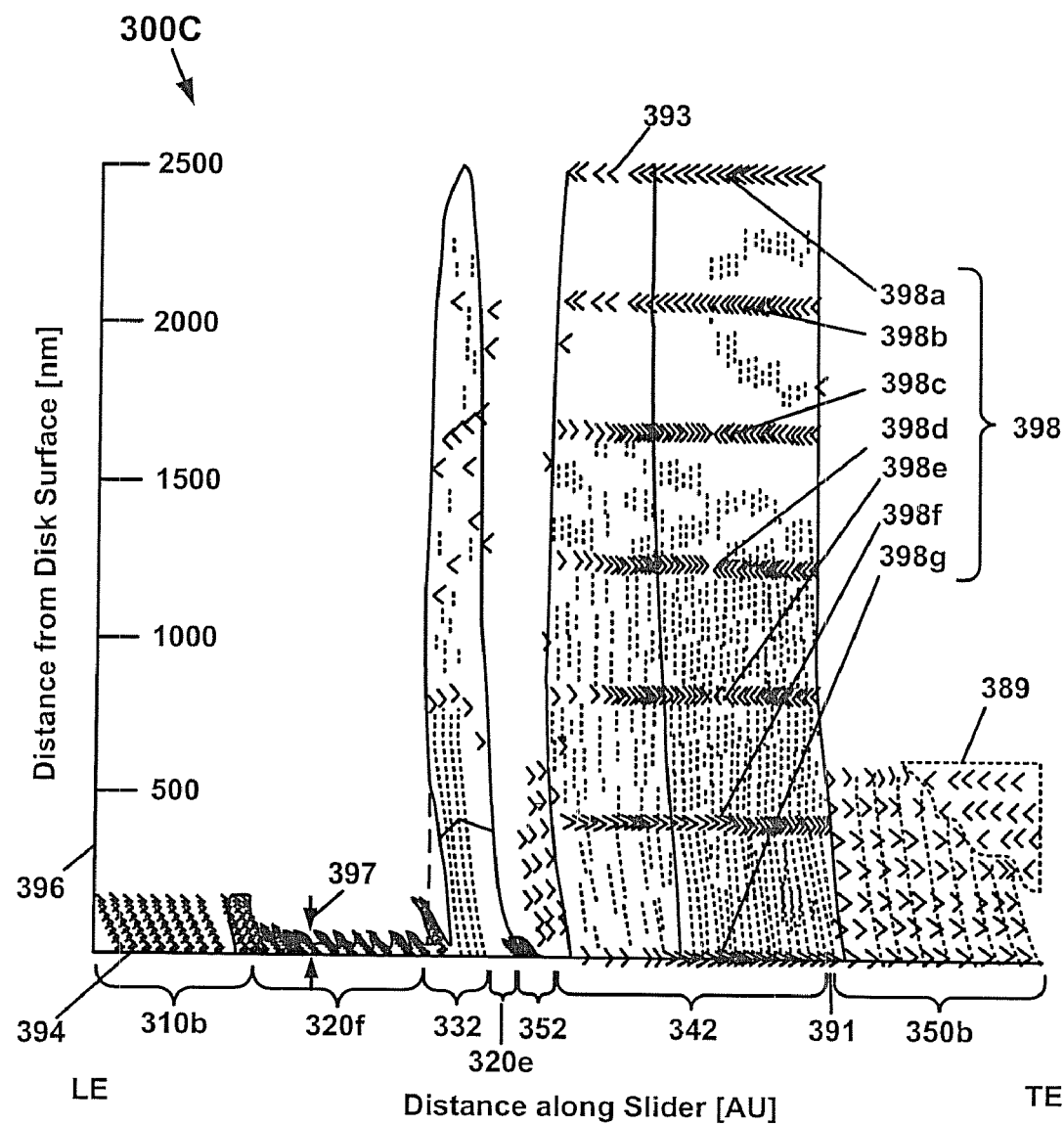
FIG. 3C is a vector-flow diagram through a vertical slice along line 3C-3C of FIG. 3B of the slider of FIG. 3A that is used to model an airflow pattern in a vertical air-column between the disk-facing slider-surface and a surface of the magnetic-recording disk in the simulation of airflow conditions that lead to lubricant accumulation at the shallow, TE OD etch pocket on the disk-facing slider-surface.

With reference now to FIG. 3C, again in order to more fully understand the utility of embodiments of the present invention, a vector-flow diagram 300C through a vertical slice along line 3C-3C over the topographical map 301 of FIG. 3B of the slider 300 of FIG. 3A is shown. FIG. 3C models an airflow pattern 398 in a vertical air-column between the disk-facing slider-surface and a surface of the magnetic-recording disk. The results of the model are used to simulate airflow conditions that lead to lubricant accumulation 380 on the shallow, TE OD etch pocket 350b of the disk-facing slider-surface. The airflow pattern 398 in the vertical air-column between the disk-facing slider-surface and the surface of a magnetic-recording disk includes a plurality of airflow contours 398a-398g equally spaced between the disk-facing slider-surface and the surface of the magnetic-recording disk. The airflow contours 398a-398g are plotted as a function of abscissa 394 that is the distance along the slider 300 in arbitrary units; the use of arbitrary units is helpful in modeling the airflow contours independent of the dimensions of the slider 300, because the dimensions of a slider often scale downwards with the advancement of technology and embodiments of the present invention are applicable to sliders of future slider designs subject to slider-dimension scaling. Thus, position along the slider 300 along line 3C-3C is given relative to the location of portions of the disk-facing slider-surface of the slider 300, given as follows starting from the LE and proceeding to the TE: the shallow, LE OD recess 310b; the LE OD pad 320f; the deep, OD channel 332; the OD, ABS-connecting portion 320e; the shallow, OD etch pocket 352; the deep, OD etch pocket 342; and, the shallow, TE OD etch pocket 350b.

With further reference to FIG. 3C, ordinate 396, for which the airflow contours 398a-398g are plotted, is the distance of the airflow contour from the disk surface, which is the surface of the rotating magnetic-recording disk; the distance from the disk surface is given in units of nanometers (nm). The scaling of the ordinates of airflow contour plots used herein, as in FIGS. 3C, 4B, 5B, 6B, 7B, 8B and 8C, are for illustrative purposes and are only approximate in nature, so that the distances recited for the depths of portions of the various disk-facing slider-surfaces described herein are to be taken as more accurate than that displayed for such portions with respect to the ordinate scaling shown in FIGS. 3C, 4B, 5B, 6B, 7B, 8B and 8C. As the distance between the disk-facing slider-surface and the surface of the rotating magnetic-recording disk varies with location of the vertical air-column over a particular portion of the disk-facing slider-surface, the distance of a given airflow contour from the disk surface varies with the location of the vertical air-column over a particular portion of the disk-facing slider-surface, because the airflow contours 398a-398g are equally spaced between the disk-facing slider-surface and the surface of the magnetic-recording disk.

For example, and with further reference to FIG. 3C, airflow contour 398a includes the plurality of directions of airflow for given points in close proximity to the disk-facing slider-surface; each direction of airflow for a given point in close proximity to the disk-facing slider-surface is given by each arrow-head of a component of an airflow vector directed along line 3C-3C of FIG. 3B at each point along the line 3C-3C. For example, arrow-head 393 is an arrow-head of a component of an airflow vector directed along line 3C-3C at a point located at about four fifths of the length of the deep, OD etch pocket 342 along the line 3C-3C in the direction of the LE from the side-wall 391 between the shallow, TE OD etch pocket 350b and the deep, OD etch pocket 342. In this manner, airflow contour 398a gives the directions of airflow directed along the direction of line 3C-3C at the projection of each point along the line 3C-3C onto and in close proximity to the disk-facing slider-surface of the slider 300. Similarly, airflow contour 398g gives the directions of airflow directed along the direction of line 3C-3C at the projection of each point along the line 3C-3C onto and in close proximity to a surface of a rotating magnetic-recording disk. Airflow contours 398b-398f give the directions of airflow directed along the direction of line 3C-3C at points in the vertical air-column over each point along the line 3C-3C equally spaced between the disk-facing slider-surface and the surface of the magnetic-recording disk, respectively.

With further reference to FIG. 3C, the distance from the disk surface includes the fly height, which varies linearly decreasingly from about 100 nm at the LE to about 10 nm at the TE, and the distance the disk-facing slider-surface lies below a top datum surface of the slider 300, which is an outer-most surface of the disk-facing side of the slider 300, which may be defined at the ABS 320. The fly height is defined as the separation distance between the ABS 320 and the disk surface; for example, the fly height at a point located at about one third of the way into the LE OD pad 320f of the ABS 320 along line 3C-3C in the direction proceeding from the LE towards the TE is designated by the pair of arrows 397. The distance that a portion of the disk-facing slider-surface lies below the ABS 320 is the distance from the disk surface of the portion of disk-facing slider-surface less the fly-height at the corresponding point of the line 3C-3C. For airflow contour 398a, this means that at the TE position along abscissa 394 the distance from the disk surface to the disk-facing slider-surface is about the same as the distance from the datum plane of the ABS 320 to the disk-facing slider-surface, being only about 10 nm more than the distance from the datum plane of the ABS 320.

With further reference to FIG. 3C, again in order to more fully understand the utility of embodiments of the present invention, the results of the model simulate the airflow conditions that lead to lubricant accumulation 380 on the shallow, TE OD etch pocket 350b of the disk-facing slider-surface. At the TE over the shallow, TE OD etch pocket 350b, the model predicts that there is located a region 389 of reverse airflow in the vertical air-column between the disk-facing slider-surface and the surface of a magnetic-recording disk, as indicated by the arrow-heads of the airflow contours 398a-398d that point in the direction of the LE. At least one utility of embodiments of the present invention lies in utilizing a geometry of a disk-facing slider-surface of a slider at a TE portion of a slider to minimize, or reduce, a reverse airflow from the TE that is produced by a negative-air-pressure portion of a slider. Embodiments of the present invention that minimize, or reduce, a reverse airflow from the TE are next described, which improve resistance of a slider to lubricant accumulation through addition of a lubricant-accumulation barrier to the slider, which is configured to reduce lubricant accumulation on the slider. Other utilities of embodiments of the present invention will be become apparent in the description of embodiments of the present invention that are subsequently described.

Figure 4A:
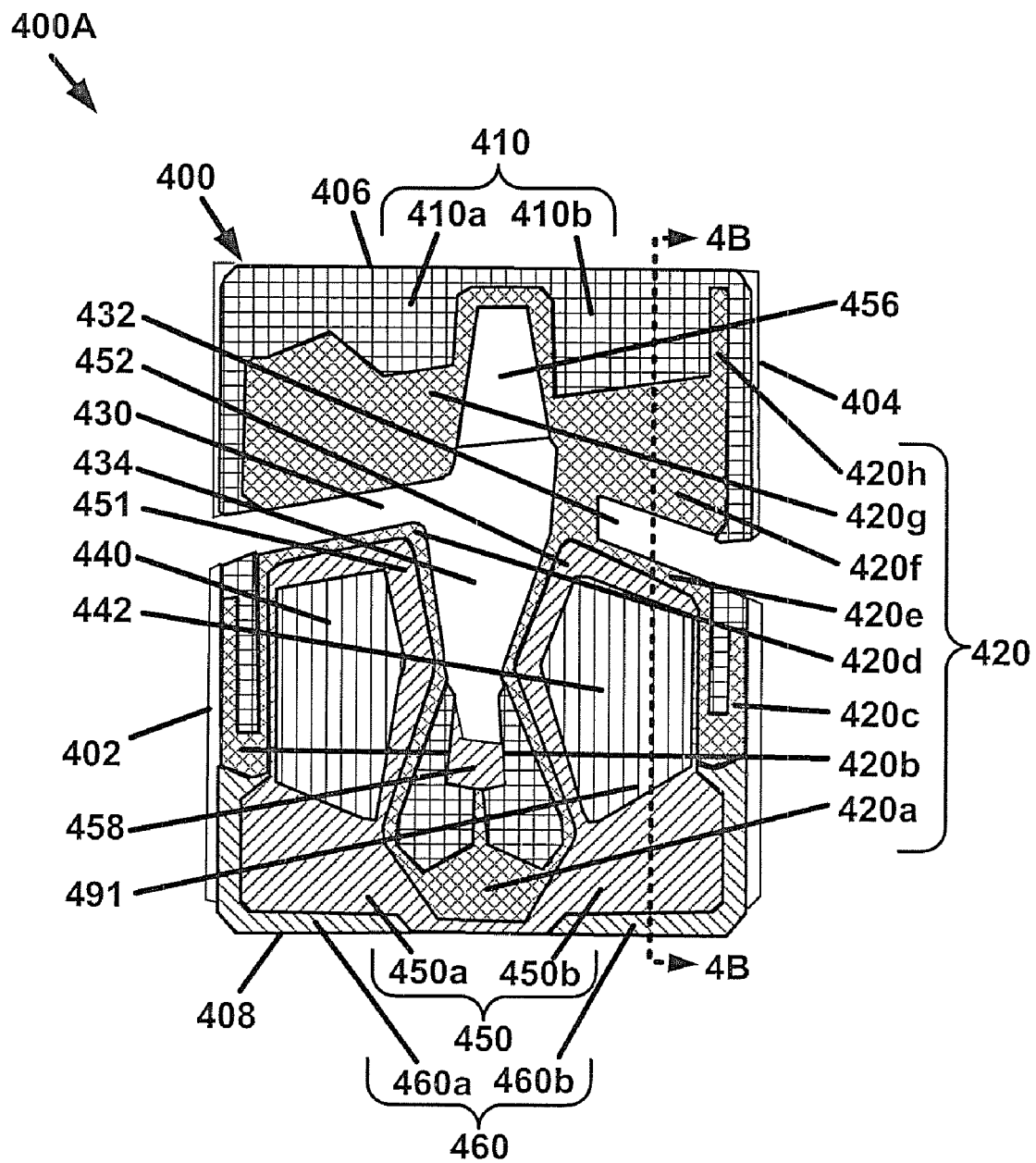
FIG. 4A is a topographical plan view of a disk-facing slider-surface of a slider including a discontinuous, lubricant-accumulation barrier that reduces lubricant accumulation at shallow, TE etch pockets on the disk-facing slider-surface, in accordance with an embodiment of the present invention.

With reference now to FIG. 4A, in accordance with embodiments of the present invention, a topographical plan view 400A of a disk-facing slider-surface of a slider 400 is shown. The slider 400 has the shape of a substantially rectangular parallelepiped. The slider 400 includes six sides: an ID side 402; an OD side 404; a LE side 406; a TE side 408; a gimbal-facing side (not shown); and, the disk-facing side as shown in the topographical plan view 400A of FIG. 4A. The slider 400 is resistant to lubricant accumulation. The slider 400 includes a positive-air-pressure portion configured to levitate the slider 400 above a magnetic-recording disk, for example, similar to the magnetic-recording disk 120. The slider 400 includes a magnetic-recording head, for example, similar to the magnetic-recording head 110a as described above. The slider 400 also includes a negative-air-pressure portion configured to bring the slider 400 into proximity with the magnetic-recording disk at a fly height sufficient for writing data to and reading data from the magnetic-recording disk by the magnetic-recording head. In addition, the slider 400 also includes a lubricant-accumulation barrier 460 disposed in proximity to a TE of the slider 400; the lubricant-accumulation barrier 460 is configured to reduce lubricant accumulation on the slider 400, especially at shallow, TE etch pockets 450 on the disk-facing slider-surface. The disk-facing slider-surface of the slider 400 may include, without limitation, the following portions: a shallow, LE recess 410; an ABS 420; a deep, ID channel 430; a deep, OD channel 432; a deep, central channel 434; a deep, ID etch pocket 440; a deep, OD etch pocket 442; shallow, TE etch pockets 450; a shallow, ID etch pocket 451; a shallow, OD etch pocket 452; a shallow, central LE etch pocket 456; and, a shallow, central TE etch pocket 458; and, the lubricant-accumulation barrier 460.

With further reference to FIG. 4A, in accordance with embodiments of the present invention, the positive-air-pressure portion of the slider 400 may include, without limitation, the ABS 420. The ABS 420 may further include, without limitation, the following portions: a TE center pad 420a; a TE ID rail 420b; a TE OD rail 420c; an ID, ABS-connecting portion 420d; an OD, ABS-connecting portion 420e; a LE OD pad 420f; a LE ID pad 420g; and, a LE OD rail 420h. A portion of the LE ID pad 420g may include a LE ID-rail portion; and, a portion of the LE OD pad 420f may include a LE OD-rail portion. The positive-air-pressure portion generates a positive air pressure that creates a fluid-dynamic air-bearing that serves to levitate the slider 400 over a rotating magnetic-recording disk, for example, similar to the magnetic-recording disk 120, during operation of an HDD, for example, similar to the HDD 100.

With further reference to FIG. 4A, in accordance with embodiments of the present invention, the positive-air-pressure portion of the slider 400 may also include a protective overcoat over the entire positive-air-pressure portion, or over selected portions of the positive-air-pressure portion, in particular, portions of the ABS 420. The protective overcoat may also extend over the magnetic-recording head (not shown), but similar to magnetic-recording head 390. The protective overcoat may include a carbon overcoat (COC), which may be composed of diamond-like carbon. The diamond-like carbon may be deposited in a cathodic-arc process, a chemical-vapor-deposition (CVD) process, or reactive sputtering process. The protective overcoat may also include a laminated structure including one or more layers of silicon, or silicon compounds, as well as one or more COC layers. The protective overcoat may be on the order of a few nanometers in thickness, up to a few tens of nanometers in thickness. The preceding discussion of this paragraph of procedures for the fabrication of a protective overcoat on the disk-facing slider-surface apply as well to the fabrication of a protective overcoat on a disk-facing slider-surface for subsequently described alternative embodiments of the present invention.

With further reference to FIG. 4A, in accordance with embodiments of the present invention, the negative-air-pressure portion may include, without limitation, the following portions: the deep, ID channel 430; the deep, OD channel 432; the deep, central channel 434; the deep, ID etch pocket 440; the deep, OD etch pocket 442; the shallow, TE etch pockets 450; the shallow, ID etch pocket 451; the shallow, OD etch pocket 452; the shallow, central LE etch pocket 456; and, the shallow, central TE etch pocket 458. The shallow, TE etch pockets 450 may further include a shallow, TE ID etch pocket 450a and a shallow, TE OD etch pocket 450b. The shallow, LE recess 410 may further include a shallow, LE ID recess 410a and a shallow, LE OD recess 410b. The negative-air-pressure portion of the slider 400 generates a negative air pressure that serves to bring the slider 400 into close proximity of the surface of the rotating magnetic-recording disk during operation of the HDD.

With further reference to FIG. 4A, in accordance with embodiments of the present invention, the lubricant-accumulation barrier 460 may include a plurality of lubricant-accumulation-barrier portions. As shown in FIG. 4A, the lubricant-accumulation barrier 460 includes, without limitation, the following portions: a TE ID lubricant-accumulation-barrier portion 460a; and a TE OD lubricant-accumulation-barrier portion 460b. As is shown in FIG. 4A, the overall shape and area of TE ID lubricant-accumulation-barrier portion 460a is about equal to the overall shape and area of a center-line reflection (not shown) of the TE OD lubricant-accumulation-barrier portion 460b defined by the reflection of the TE OD lubricant-accumulation-barrier portion 460b within the plane of the disk-facing side of the slider 400 across a center-line running from the LE to the TE of the slider 400. Thus, the TE ID lubricant-accumulation-barrier portion 460a is congruent with the center-line reflection of the TE OD lubricant-accumulation-barrier portion 460b. Also, the TE ID lubricant-accumulation-barrier portion 460a and the TE OD lubricant-accumulation-barrier portion 460b are symmetrically disposed with respect to the TE center pad 420a of the ABS 420. The lubricant-accumulation-barrier portions may be disposed at a plurality of respective depths below an outer-most surface, which may be defined at the ABS 420, of the disk-facing side of the slider 400. As shown in FIG. 4A, the depth below the ABS 420 of TE ID lubricant-accumulation-barrier portion 460a is about the same as the depth below the ABS 420 of the TE OD lubricant-accumulation-barrier portion 460b. However, as is subsequently described, embodiments of the present invention are not limited to lubricant-accumulation-barrier portions disposed at about the same depths below an outer-most surface of the disk-facing side of the slider, but also may include a plurality of lubricant-accumulation-barrier portions disposed at a plurality of respectively different depths below an outer-most surface of the disk-facing side of the slider. As shown by the figures herein, FIGS. 4A, 5A, 6A, 7A and 8A, portions of a disk-facing slider-surface at the same relative height on disk-facing slider-surface are shown in the same gray-tone in a given figure. As further shown in FIG. 4A, the lubricant-accumulation barrier 460 may be discontinuous from the OD side 404 of the slider 400 to the ID side 402 of the slider 400. However, as is subsequently described, embodiments of the present invention are not limited to a lubricant-accumulation barrier that is discontinuous from an OD side of a slider to an ID side of a slider.

With further reference to FIG. 4A, in accordance with embodiments of the present invention, the various portions of the disk-facing slider-surface described herein may be fabricated using photolithographic processes in conjunction with reactive ion-etching (RIE) or ion-milling to remove material from the slider 400 not protected by photoresist. Fabrication of portions of the disk-facing slider-surface, for example, the deep, OD etch pocket 442, may include: depositing a layer of photoresist, patterning the photoresist with a pattern provided by a photolithographic mask to provide a photoresist mask on the disk-facing slider-surface, removing material from the slider 400 at exposed portions of the slider 400 not protected by the patterned photoresist. To define the plurality of portions of the disk-facing slider-surface, a single photoresist mask may be used to define a plurality of portions of the disk-facing slider-surface having the same depths below an outer-most surface of the disk-facing side of the slider 400, for example, the plurality of portions including: the deep, ID channel 430; the deep, OD channel 432; the deep, central channel 434; the deep, ID etch pocket 440; and, the deep, OD etch pocket 442. Since various portions of the disk-facing slider-surface may have different depths relative to the outer-most surface of the disk-facing side, several photoresist masks and slider-material removal procedures may be required to define all the topographical features and geometry of the disk-facing slider-surface, including the geometry of lubricant-accumulation-barriers described herein. The photoresist masks may also be used to fabricate hard mask layers which are more resistant to the attack of ion-beams and/or reactive ions used in defining the topographical features and geometry of the disk-facing slider-surface, in which case the photoresist may be removed after defining the hard mask layers prior to the application of slider-material-removal procedures, such as RIE and ion-milling. These hard masks may be fabricated from layers of hard-mask material selected from the group consisting of rhodium, tantalum, tantalum compounds, alumina, silicon, silicon compounds, polyimide compounds, for example, Durimide™, and laminated structures including layers of such hard-mask materials. If a hard-mask is used in the definition of the topographical features and geometry of the disk-facing slider-surface, an additional operation may be employed to remove the hard-mask, which may consist of etching away the hard-mask with reagents or processes that selectively attack the hard-mask materials. The preceding discussion of this paragraph of procedures for the definition of topographical features and geometry of the disk-facing slider-surface, including the geometry of lubricant-accumulation-barriers, apply as well to the definition of topographical features and geometry of the disk-facing slider-surface for subsequently described alternative embodiments of the present invention.

Figure 4B:
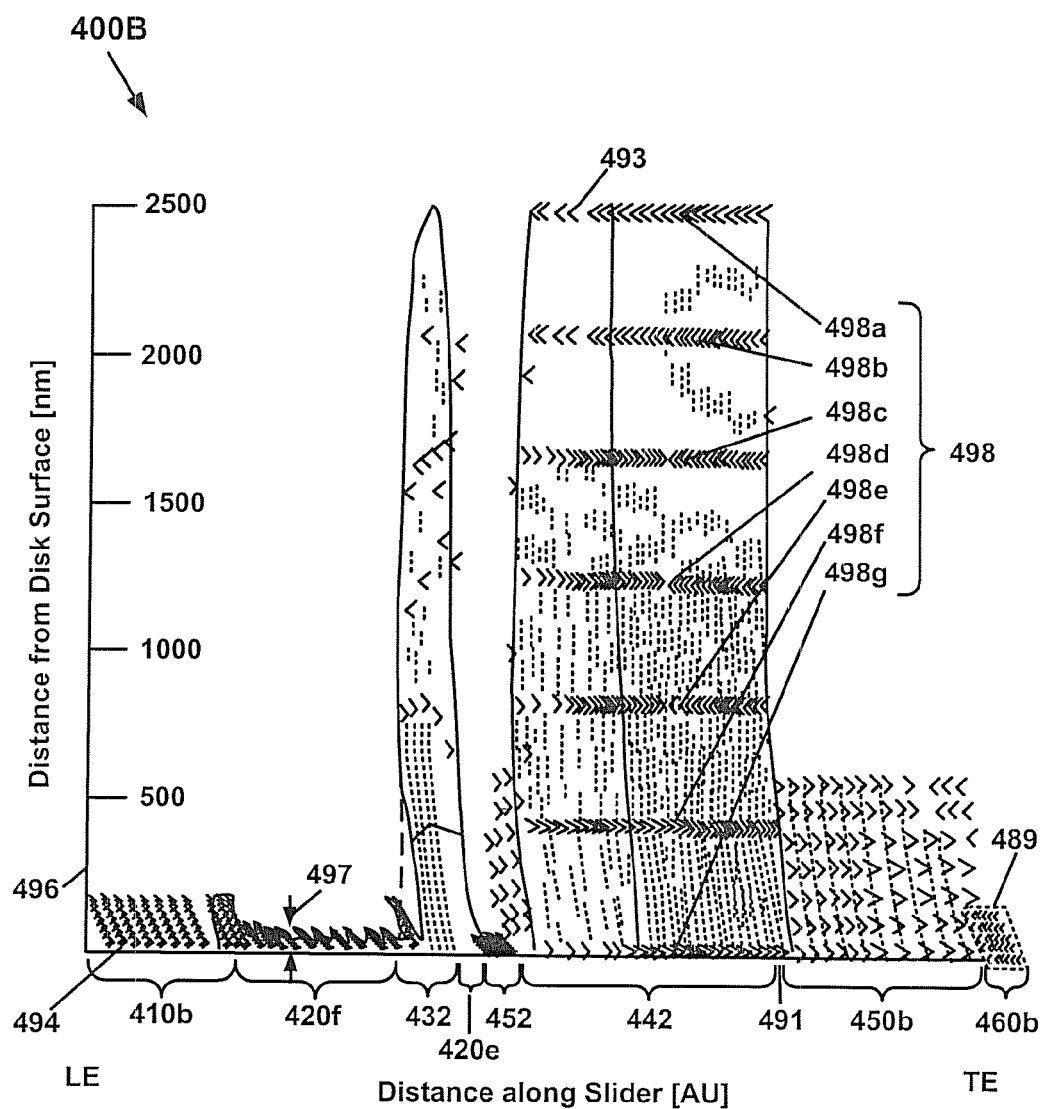
FIG. 4B is a vector-flow diagram through a vertical slice along line 4B-4B of FIG. 4A that is used to model an airflow pattern in a vertical air-column between the disk-facing slider-surface and a surface of a magnetic-recording disk in the simulation of airflow conditions that reduce lubricant accumulation at the shallow, TE etch pockets on the disk-facing slider-surface, in accordance with an embodiment of the present invention.

With reference now to FIG. 4B, in accordance with embodiments of the present invention, a vector-flow diagram through a vertical slice along line 4B-4B of FIG. 4A of the slider 400 is shown. FIG. 4B models an airflow pattern 498 in a vertical air-column between the disk-facing slider-surface of the slider 400 and a surface of the magnetic-recording disk. The results of the model are used to simulate airflow conditions that may lead to lubricant accumulation on the shallow, TE OD etch pocket 450b of the disk-facing slider-surface.

The airflow pattern 498 in the vertical air-column between the disk-facing slider-surface and the surface of a magnetic-recording disk includes a plurality of airflow contours 498a-498g equally spaced between the disk-facing slider-surface and the surface of the magnetic-recording disk. The airflow contours 498a-498g are plotted as a function of abscissa 494 that is distance along the slider 400 in arbitrary units, similar to abscissa 394 of FIG. 3C. Thus, position along the slider 400 along line 4B-4B is given relative to the location of portions of the disk-facing slider-surface, given as follows starting from the LE and proceeding to the TE: the shallow, LE OD recess 410b; the LE OD pad 420f; the deep, OD channel 432; the OD, ABS-connecting portion 420e; the shallow, OD etch pocket 452; the deep, OD etch pocket 442; the shallow, TE OD etch pocket 450b; and, the TE OD lubricant-accumulation-barrier portion 460b.

With further reference to FIG. 4B, ordinate 496, for which the airflow contours 498a-498g are plotted, is the distance of the airflow contour from the disk surface, which is the surface of the rotating magnetic-recording disk; the distance from the disk surface is given in units of nanometers (nm). As the distance between the disk-facing slider-surface and the surface of the rotating magnetic-recording disk varies with location of the vertical air-column over a particular portion of the disk-facing slider-surface, the distance of a given airflow contour from the disk surface varies with the location of the vertical air-column over a particular portion of the disk-facing slider-surface, because the airflow contours 498a-498g are equally spaced between the disk-facing slider-surface and the surface of the magnetic-recording disk. The distance along the ordinate is about equal to the depth below the outer-most surface of the disk-facing side differing only by the fly height of the slider 400 at the location of a given portion of the disk-facing side of the slider 400 used to label abscissa 494. For example, although not shown precisely to scale in FIG. 4B, the distance of portions of the disk-facing slider-surface from the surface of the magnetic-recording disk is about the same as the height of airflow contour 498a, which is greater than the depth of portions of the disk-facing slider-surface below the outer-most surface of the disk-facing side by the fly height of the slider 400 at the location of a given portion. The depths of portions of the disk-facing slider-surface below the outer-most surface of the disk-facing side of the slider 400 are as follows: for the shallow, LE OD recess 410b, about 150 nm; the LE OD pad 420f of the ABS 420, about 0 nm; the deep, OD channel 432, about 2500 nm; the OD, ABS-connecting portion 420e, about 0 nm; the shallow, OD etch pocket 452, about 800 nm; the deep, OD etch pocket 442, about 2500 nm; the shallow, TE OD etch pocket 450b, about 800 nm; and, the TE OD lubricant-accumulation-barrier portion 460b, about 150 nm. A portion of the disk-facing slider-surface shown in FIG. 4A with the same gray-tone as a portion used to label abscissa 494 in FIG. 4B may have about the same depth below the outer-most surface of the disk-facing side of the slider 400 as the portion used to label abscissa 494.

For example, and with further reference to FIG. 4B, airflow contour 498a includes the plurality of directions of airflow for given points in close proximity to the disk-facing slider-surface of the slider 400; each direction of airflow for a given point in close proximity to the disk-facing slider-surface is given by each arrow-head of a component of an airflow vector directed along line 4B-4B of FIG. 4A at each point along the line 4B-4B. For example, arrow-head 493 is an arrow-head of a component of an airflow vector directed along line 4B-4B at a point located at about four fifths of the length of the deep, OD etch pocket 442 along the line 4B-4B in the direction of the LE from side-wall 491 between the shallow, TE OD etch pocket 450b and the deep, OD etch pocket 442. In this manner, airflow contour 498a gives the directions of airflow directed along the direction of line 4B-4B at the projection of each point along the line 4B-4B onto and in close proximity to the disk-facing slider-surface. Similarly, airflow contour 498g gives the directions of airflow directed along the direction of line 4B-4B at the projection of each point along the line 4B-4B onto and in close proximity to a surface of a rotating magnetic-recording disk. Airflow contours 498b-498f give the directions of airflow directed along the direction of line 4B-4B at points in the vertical air-column over each point along the line 4B-4B equally spaced between the disk-facing slider-surface and the surface of the magnetic-recording disk, respectively.

With further reference to FIG. 4B, in accordance with alternative embodiments of the present invention, the distance from the disk surface includes the fly height, which varies linearly decreasingly from about 100 nm at the LE to about 10 nm at the TE, and the distance the disk-facing slider-surface lies below a top datum surface of the slider 400, which is an outer-most surface of the disk-facing side of the slider 400. The fly height is defined as the separation distance between the ABS 420 and the disk surface; for example, the fly height at a point located at about one third of the way into the LE OD pad 420f of the ABS 420 along line 4B-4B in the direction proceeding from the LE towards the TE is designated by the pair of arrows 497. The distance that a portion of the disk-facing slider-surface lies below the ABS 420 is the distance from the disk surface of the portion of disk-facing slider-surface less the fly-height at the corresponding point of the line 4B-4B. For airflow contour 498a, this means that at the TE position along abscissa 494 the distance from the disk surface to the disk-facing slider-surface is about the same as the distance from the datum plane of the ABS 420 to the disk-facing slider-surface, being only about 10 nm more than the distance from the datum plane of the ABS 420.

With further reference to FIG. 4B, in accordance with embodiments of the present invention, the results of the model simulate the airflow conditions that may lead to lubricant accumulation on the shallow, TE OD etch pocket 450b of the disk-facing slider-surface. At the TE over the TE OD lubricant-accumulation-barrier portion 460b, the model predicts that there is located a region 489 of positive airflow, or at least reduced reverse airflow, in the vertical air-column between the disk-facing slider-surface of the slider 400 and the surface of a magnetic-recording disk, as indicated by the numerous arrow-heads of the airflow contours 498a-498g that point in the direction of the TE. Thus, the lubricant-accumulation barrier 460, as well as the component portions of the lubricant-accumulation barrier 460, the TE ID lubricant-accumulation-barrier portion 460a and the TE OD lubricant-accumulation-barrier portion 460b, is configured to reduce reverse airflow over the lubricant-accumulation barrier 460 and portions thereof 460a and 460b. In accordance with embodiments of the present invention, the lubricant-accumulation barrier 460 and individual lubricant-accumulation-barrier portions 460a and 460b may have a depth between about 150 nm and about 600 nm below an outer-most surface of a disk-facing side. For example, the lubricant-accumulation-barrier portions 460a and 460b are about 150 nm above the surface of the magnetic-recording disk; if the nominal fly height at the TE is taken into account, lubricant-accumulation-barrier portions 460a and 460b have a depth about 140 nm below the ABS 420, which may be taken as the outer-most surface of the disk-facing side of the slider 400. However, the height of the lubricant-accumulation barrier 460 above the deep etch pocket 442, as well as the component portions 460a and 460b of the lubricant-accumulation barrier 460, is substantially higher than most other portions of the disk-facing slider-surface, except for the ABS 420. For example, as shown in FIG. 4B, the TE OD lubricant-accumulation-barrier portion 460b is about 150 nm above the disk surface, and the adjacent shallow, TE OD etch pocket 450b is 800 nm above the disk surface, which makes the TE OD lubricant-accumulation-barrier portion 460b about 650 nm higher than the adjacent shallow, TE OD etch pocket 450b. Because a lubricant-accumulation-barrier is higher than the most other portions of the disk-facing slider-surface, the term of art "lube dam" has been used by the inventor to figuratively describe the function of the lubricant-accumulation-barrier. As shown in FIG. 4A, the lubricant-accumulation barrier 460 is discontinuous from the OD side 404 of the slider 400 to the ID side 402 of the slider 400, such that the TE ID lubricant-accumulation-barrier portion 460a is separated from the TE OD lubricant-accumulation-barrier portion 460b by: the shallow, TE ID etch pocket 450a, the TE center pad 420a, and the shallow, TE OD etch pocket 450b. Thus, reverse airflow may still occur at the openings created by portions of the shallow, TE etch pockets 450 that reach the TE, for example, portions of the shallow, TE ID etch pocket 450a and the shallow, TE OD etch pocket 450b that reach the TE adjacent to the TE center pad 420a.

Figure 5A:
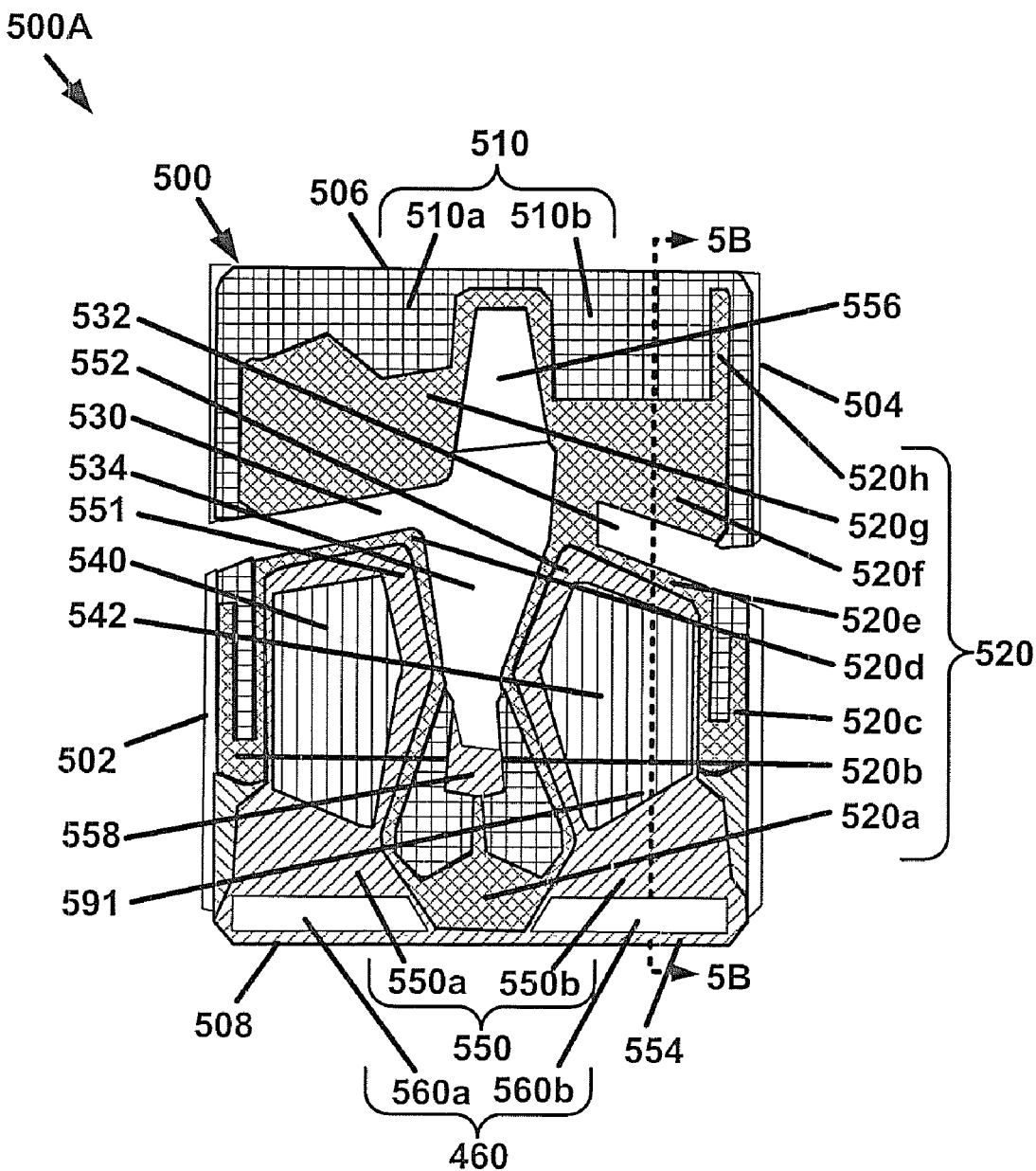
FIG. 5A is a topographical plan view of a disk-facing slider-surface of an alternative design for a slider including a discontinuous, lubricant-accumulation barrier that reduces lubricant accumulation at shallow, TE etch pockets on the disk-facing slider-surface, in accordance with an embodiment of the present invention.

With reference now to FIG. 5A, in accordance with alternative embodiments of the present invention, a topographical plan view 500A of a disk-facing slider-surface of a slider 500 is shown. The slider 500 has the shape of a substantially rectangular parallelepiped. The slider 500 includes six sides: an ID side 502; an OD side 504; a LE side 506; a TE side 508; a gimbal-facing side (not shown); and, the disk-facing side as shown in the topographical plan view 500A of FIG. 5A. The slider 500 is resistant to lubricant accumulation. The slider 500 includes a positive-air-pressure portion configured to levitate the slider 500 above a magnetic-recording disk, for example, similar to the magnetic-recording disk 120. The slider 500 includes a magnetic-recording head, for example, similar to the magnetic-recording head 110a as described above. The slider 500 also includes a negative-air-pressure portion configured to bring the slider 500 into proximity with the magnetic-recording disk at a fly height sufficient for writing data to and reading data from the magnetic-recording disk by the magnetic-recording head. In addition, the slider 500 also includes a lubricant-accumulation barrier 560 disposed in proximity to a TE of the slider 500; the lubricant-accumulation barrier 560 is configured to reduce lubricant accumulation on the slider 500, especially at shallow, TE etch pockets 550 on the disk-facing slider-surface. The disk-facing slider-surface of the slider 500 may include, without limitation, the following portions: a shallow, LE recess 510; an ABS 520; a deep, ID channel 530; a deep, OD channel 532; a deep, central channel 534; a deep, ID etch pocket 540; a deep, OD etch pocket 542; shallow, TE etch pockets 550; a shallow, ID etch pocket 551; a shallow, OD etch pocket 552; a shallow, central LE etch pocket 556; a shallow, central TE etch pocket 558; the lubricant-accumulation barrier 560; and, a the shallow TE tail recess 554.

With further reference to FIG. 5A, in accordance with embodiments of the present invention, the positive-air-pressure portion of the slider 500 may include, without limitation, the ABS 520. The ABS 520 may further include, without limitation, the following portions: a TE center pad 520a; a TE ID rail 520b; a TE OD rail 520c; an ID, ABS-connecting portion 520d; an OD, ABS-connecting portion 520e; a LE OD pad 520f; a LE ID pad 520g; and, a LE OD rail 520h. A portion of the LE ID pad 520g may include a LE ID-rail portion; and, a portion of the LE OD pad 520f may include a LE OD-rail portion. The positive-air-pressure portion generates a positive air pressure that creates a fluid-dynamic air-bearing that serves to levitate the slider 500 over a rotating magnetic-recording disk, for example, similar to the magnetic-recording disk 120, during operation of an HDD, for example, similar to the HDD 100.

With further reference to FIG. 5A, in accordance with embodiments of the present invention, the negative-air-pressure portion of the slider 500 may include, without limitation, the following portions: the deep, ID channel 530; the deep, OD channel 532; the deep, central channel 534; the deep, ID etch pocket 540; the deep, OD etch pocket 542; the shallow, TE etch pockets 550; the shallow, ID etch pocket 551; the shallow, OD etch pocket 552; the shallow, central LE etch pocket 556; and, the shallow, central TE etch pocket 558. The shallow, TE etch pockets 550 may further include a shallow, TE ID etch pocket 550a and a shallow, TE OD etch pocket 550b. The shallow, LE recess 510 may further include a shallow, LE ID recess 510a and a shallow, LE OD recess 510b. The negative-air-pressure portion generates a negative air pressure that serves to bring the slider 500 into close proximity of the surface of the rotating magnetic-recording disk during operation of the HDD.

With further reference to FIG. 5A, in accordance with embodiments of the present invention, the lubricant-accumulation barrier 560 may include a plurality of lubricant-accumulation-barrier portions. As shown in FIG. 5A, the lubricant-accumulation barrier 560 includes, without limitation, the following portions: a TE ID lubricant-accumulation-barrier portion 560a; and a TE OD lubricant-accumulation-barrier portion 560b. As is shown in FIG. 5A, the overall shape and area of TE ID lubricant-accumulation-barrier portion 560a is about equal to the overall shape and area of a center-line reflection (not shown) of the TE OD lubricant-accumulation-barrier portion 560b defined by the reflection of the TE OD lubricant-accumulation-barrier portion 560b within the plane of the disk-facing side of the slider 500 across a center-line running from the LE to the TE of the slider 500. Thus, the TE ID lubricant-accumulation-barrier portion 560a is congruent with the center-line reflection of the TE OD lubricant-accumulation-barrier portion 560b. Also, the TE ID lubricant-accumulation-barrier portion 560a and the TE OD lubricant-accumulation-barrier portion 560b are symmetrically disposed with respect to the TE center pad 520a of the ABS 520. The lubricant-accumulation-barrier portions may be disposed at a plurality of respective depths below an outer-most surface, which may be defined at the ABS 520, of the disk-facing side of the slider 500. As shown in FIG. 5A, the depth below the ABS 520 of TE ID lubricant-accumulation-barrier portion 560a is about the same as the depth below the ABS 520 of the TE OD lubricant-accumulation-barrier portion 560b. As further shown in FIG. 5A, the lubricant-accumulation barrier 560 may be discontinuous from the OD side 504 of the slider 500 to the ID side 502 of the slider 500.

Figure 5B:
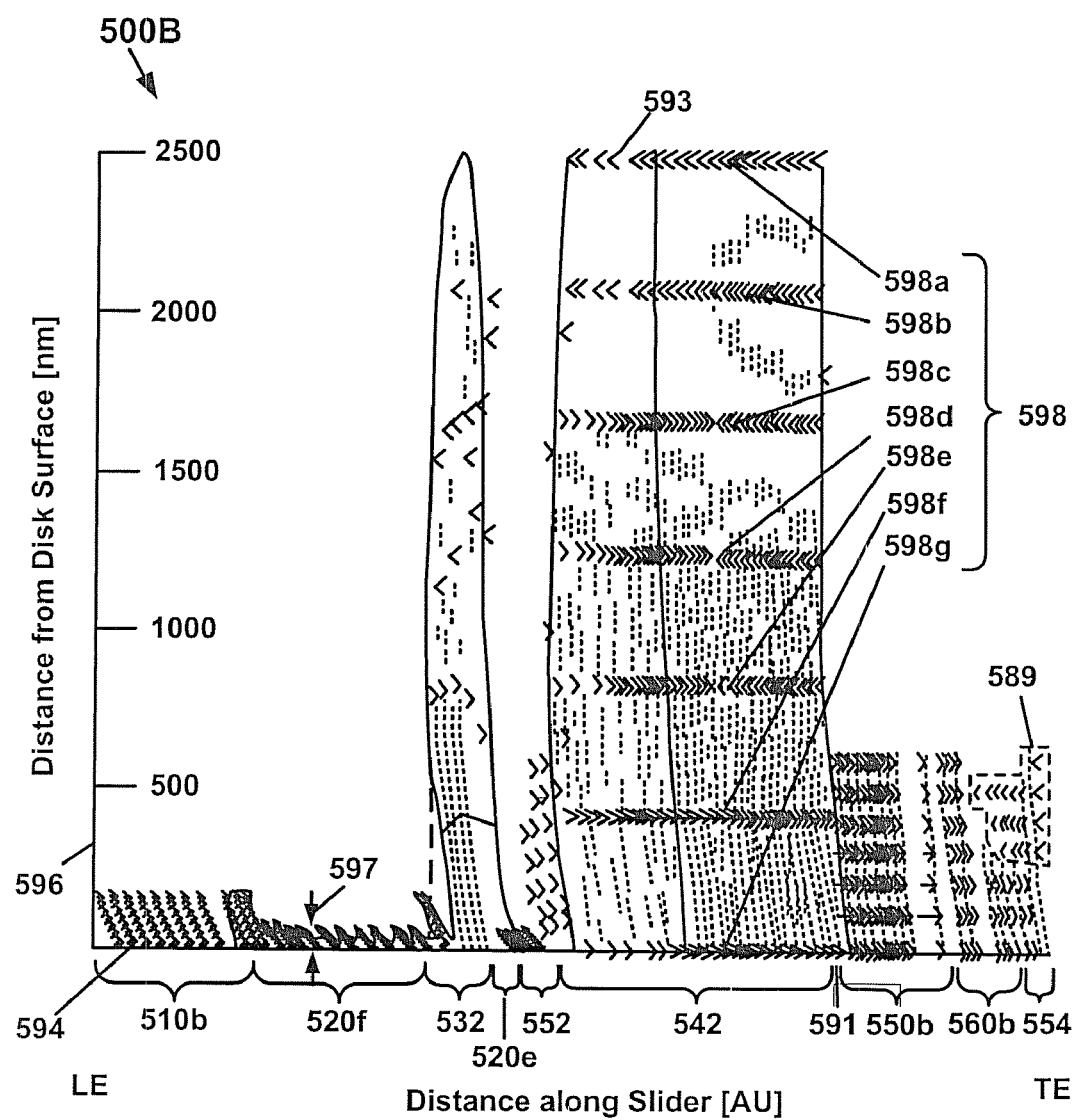
FIG. 5B is a vector-flow diagram through a vertical slice along line 5B-5B of FIG. 5A that is used to model an airflow pattern in a vertical air-column between the disc-facing slider-surface and a surface of a magnetic-recording disk in the simulation of airflow conditions that reduce lubricant accumulation at the shallow, TE etch pockets on the disk-facing slider-surface, in accordance with an embodiment of the present invention.

With reference now to FIG. 5B, in accordance with alternative embodiments of the present invention, a vector-flow diagram 500B through a vertical slice along line 5B-5B of FIG. 5A of the slider 500 is shown. FIG. 5B models an airflow pattern 598 in a vertical air-column between the disk-facing slider-surface of the slider 500 and a surface of the magnetic-recording disk. The results of the model are used to simulate airflow conditions that may lead to lubricant accumulation on the shallow, TE OD etch pocket 550b of the disk-facing slider-surface. The airflow pattern 598 in the vertical air-column between the disk-facing slider-surface and the surface of a magnetic-recording disk includes a plurality of airflow contours 598a-598g equally spaced between the disk-facing slider-surface and the surface of the magnetic-recording disk. The airflow contours 598a-598g are plotted as a function of abscissa 594 that is the distance along the slider 500 in arbitrary units, similar to abscissa 394 of FIG. 3C. Thus, position along the slider 500 along line 5B-5B is given relative to the location of portions of the disk-facing slider-surface, given as follows starting from the LE and proceeding to the TE: the shallow, LE OD recess 510b; the LE OD pad 520f; the deep, OD channel 532; the OD, ABS-connecting portion 520e; the shallow, OD etch pocket 552; the deep, OD etch pocket 542; the shallow, TE OD etch pocket 550b; the TE OD lubricant-accumulation-barrier portion 560b; and, the shallow TE tail recess 554.

With further reference to FIG. 5B, ordinate 596, for which the airflow contours 598a-598g are plotted, is the distance of the airflow contour from the disk surface, which is the surface of the rotating magnetic-recording disk; the distance from the disk surface is given in units of nanometers (nm). As the distance between the disk-facing slider-surface and the surface of the rotating magnetic-recording disk varies with location of the vertical air-column over a particular portion of the disk-facing slider-surface, the distance of a given airflow contour from the disk surface varies with the location of the vertical air-column over a particular portion of the disk-facing slider-surface, because the airflow contours 598a-598g are equally spaced between the disk-facing slider-surface and the surface of the magnetic-recording disk. The distance along the ordinate is about equal to the depth below the outer-most surface of the disk-facing side differing only by the fly height of the slider 500 at the location of a given portion of the disk-facing side of the slider 500 used to label abscissa 594. For example, although not shown precisely to scale in FIG. 5B, the distance of portions of the disk-facing slider-surface from the surface of the magnetic-recording disk is about the same as the height of airflow contour 598a, which is greater than the depth of portions of the disk-facing slider-surface below the outer-most surface of the disk-facing side of the slider 500 by the fly height of the slider 500 at the location of a given portion. The depths of portions of the disk-facing slider-surface below the outer-most surface of the disk-facing side of the slider 500 are as follows: for the shallow, LE OD recess 510b, about 150 nm; the LE OD pad 520f, about 0 nm; the deep, OD channel 532, about 2500 nm; the OD, ABS-connecting portion 520e, about 0 nm; the shallow, OD etch pocket 552, about 800 nm; the deep, OD etch pocket 542, about 2500 nm; the shallow, TE OD etch pocket 550b, about 800 nm; the TE OD lubricant-accumulation-barrier portion 560b, about 600 nm; and, the shallow TE tail recess 554, about 800 nm. A portion of the disk-facing slider-surface shown in FIG. 5A with the same gray-tone as a portion used to label abscissa 594 in FIG. 5B may have about the same depth below the outer-most surface of the disk-facing side of the slider 500 as the portion used to label abscissa 594.

For example, and with further reference to FIG. 5B, airflow contour 598a includes the plurality of directions of airflow for given points in close proximity to the disk-facing slider-surface; each direction of airflow for a given point in close proximity to the disk-facing slider-surface is given by each arrow-head of a component of an airflow vector directed along line 5B-5B of FIG. 5A at each point along the line 5B-5B. For example, arrow-head 593 is an arrow-head of a component of an airflow vector directed along line 5B-5B at a point located at about four fifths of the length of the deep, OD etch pocket 542 along the line 5B-5B in the direction of the LE from the side-wall 591 between the shallow, TE OD etch pocket 550b and the deep, OD etch pocket 542. In this manner, airflow contour 598a gives the directions of airflow directed along the direction of line 5B-5B at the projection of each point along the line 5B-5B onto and in close proximity to the disk-facing slider-surface of the slider 500. Similarly, airflow contour 598g gives the directions of airflow directed along the direction of line 5B-5B at the projection of each point along the line 5B-5B onto and in close proximity to a surface of a rotating magnetic-recording disk. Airflow contours 598b-598f give the directions of airflow directed along the direction of line 5B-5B at points in the vertical air-column over each point along the line 5B-5B equally spaced between the disk-facing slider-surface and the surface of the magnetic-recording disk, respectively.

With further reference to FIG. 5B, in accordance with alternative embodiments of the present invention, the distance from the disk surface includes the fly height, which varies linearly decreasingly from about 100 nm at the LE to about 10 nm at the TE, and the distance the disk-facing slider-surface lies below a top datum surface of the slider 500, which is an outer-most surface of the disk-facing side of the slider 500. The fly height is defined as the separation distance between the ABS 520 and the disk surface; for example, the fly height at a point located at about one third of the way into the LE OD pad 520f of the ABS 520 along line 5B-5B in the direction proceeding from the LE towards the TE is designated by the pair of arrows 597. The distance that a portion of the disk-facing slider-surface lies below the ABS 520 is the distance from the disk surface of the portion of disk-facing slider-surface less the fly-height at the corresponding point of the line 5B-5B. For airflow contour 598a, this means that at the TE position along abscissa 594 the distance from the disk surface to the disk-facing slider-surface is about the same as the distance from the datum plane of the ABS 520 to the disk-facing slider-surface, being only about 10 nm more than the distance from the datum plane of the ABS 520.

With further reference to FIG. 5B, in accordance with alternative embodiments of the present invention, the results of the model simulate the airflow conditions that may lead to lubricant accumulation on the shallow, TE OD etch pocket 550b of the disk-facing slider-surface. At the TE over the TE OD lubricant-accumulation-barrier portion 560b, the model predicts that there is located a region 589 of reduced reverse airflow, compared with the region 389 of reverse airflow over the slider 300 that produces lubricant accumulation 380, in the vertical air-column between the disk-facing slider-surface of the slider 500 and the surface of a magnetic-recording disk, as indicated by the numerous arrow-heads of the airflow contours 598a-598g that point in the direction of the TE. Thus, the lubricant-accumulation barrier 560, as well as the component portions of the lubricant-accumulation barrier 560, the TE ID lubricant-accumulation-barrier portion 560a and the TE OD lubricant-accumulation-barrier portion 560b, is configured to reduce reverse airflow over the lubricant-accumulation barrier 560 and portions thereof 560a and 560b. In accordance with embodiments of the present invention, the lubricant-accumulation barrier 560 and individual lubricant-accumulation-barrier portions 560a and 560b may have a depth between about 150 nm and about 600 nm below an outer-most surface of a disk-facing side of the slider 500. For example, the lubricant-accumulation-barrier portions 560a and 560b are about 600 nm above the surface of the magnetic-recording disk; if the nominal fly height at the TE is taken into account, lubricant-accumulation-barrier portions 560a and 560b have a depth about 590 nm below the ABS 520, which may be taken as the outer-most surface of the disk-facing side of the slider 500. As shown in FIG. 5A, the lubricant-accumulation barrier 560 is discontinuous from the OD side 504 of the slider 500 to the ID side 502 of the slider 500, such that the TE ID lubricant-accumulation-barrier portion 560a is separated from the TE OD lubricant-accumulation-barrier portion 560b by the TE center pad 520a. Because the TE center pad 520a is higher than the lubricant-accumulation barrier 560, there are no openings created in between the portions of the lubricant-accumulation-barrier 560a and 560b and the TE center pad 520a. There are trade-offs between ABS flight characteristics of a slider and the type of "lube dam" design chosen for a lubricant-accumulation barrier. In the case of the slider 500, the design of the lubricant-accumulation barrier 560 is expected to produce the smallest change in the overall ABS flight performance. However, since the height of the lubricant-accumulation barrier 560 is lower compared to the lubricant-accumulation barrier 460, it may be expected that the slider 500 might have a greater tendency to collect a lubricant accumulation, because the region 589 of reverse airflow is just reduced, but not eliminated.

Figure 6A:
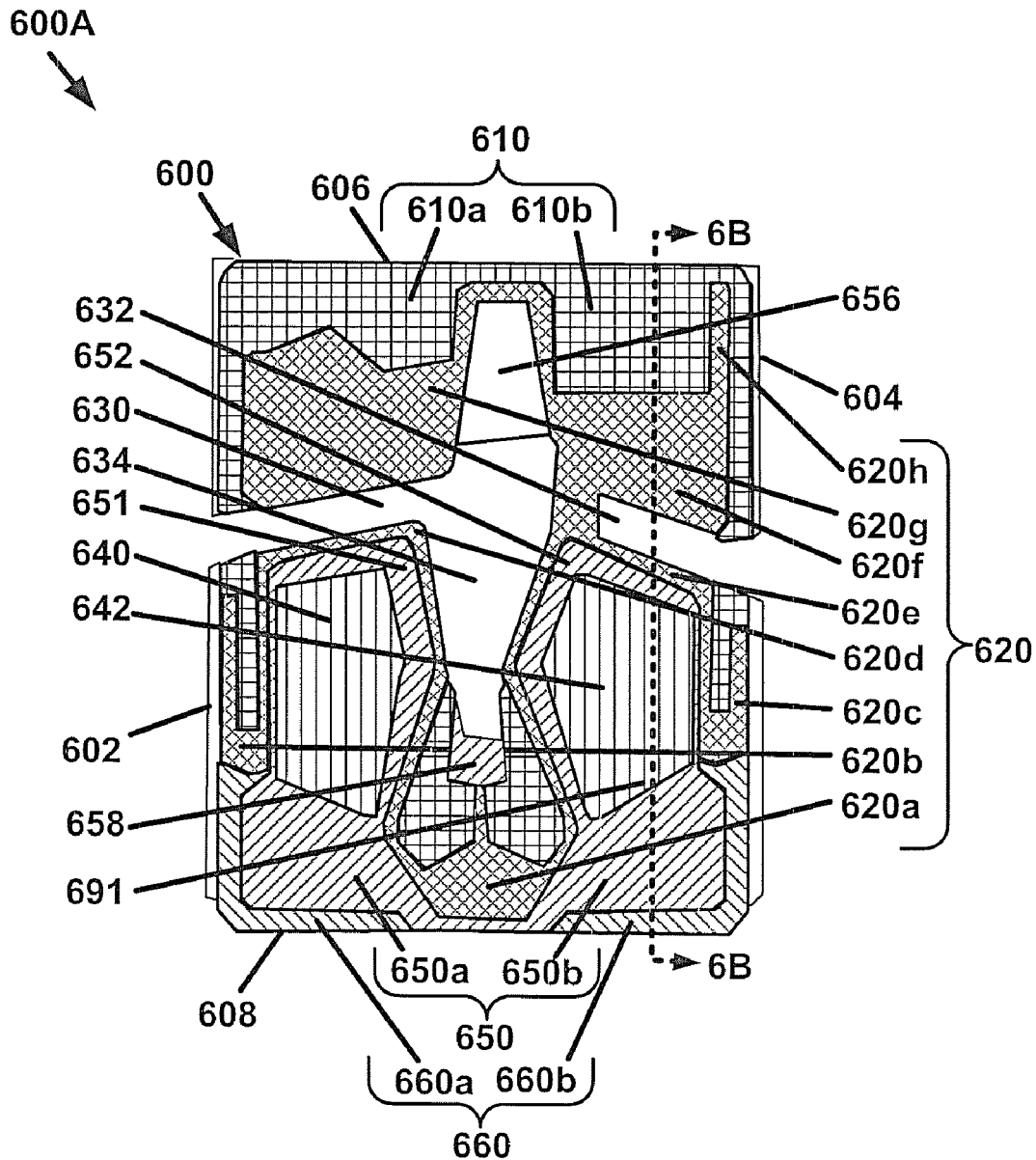
FIG. 6A is a topographical plan view of a disk-facing slider-surface of a slider including a continuous, lubricant-accumulation barrier that reduces lubricant accumulation at shallow, TE etch pockets on the disk-facing slider-surface, in accordance with an embodiment of the present invention.

With reference now to FIG. 6A, in accordance with alternative embodiments of the present invention, a topographical plan view 600A of a disk-facing slider-surface of a slider 600 is shown. The slider 600 has the shape of a substantially rectangular parallelepiped. The slider 600 includes six sides: an ID side 602; an OD side 604; a LE side 606; a TE side 608; a gimbal-facing side (not shown); and, the disk-facing side as shown in the topographical plan view 600A of FIG. 6A. The slider 600 is resistant to lubricant accumulation. The slider 600 includes a positive-air-pressure portion configured to levitate the slider 600 above a magnetic-recording disk, for example, similar to the magnetic-recording disk 120. The slider 600 includes a magnetic-recording head, for example, similar to the magnetic-recording head 110a as described above. The slider 600 also includes a negative-air-pressure portion configured to bring the slider 600 into proximity with the magnetic-recording disk at a fly height sufficient for writing data to and reading data from the magnetic-recording disk by the magnetic-recording head. In addition, the slider 600 also includes a lubricant-accumulation barrier 660 disposed in proximity to a TE of the slider 600; the lubricant-accumulation barrier 660 is configured to reduce lubricant accumulation on the slider 600, especially at the shallow, TE etch pockets 650 on the disk-facing slider-surface. The disk-facing slider-surface of the slider 600 may include, without limitation, the following portions: a shallow, LE recess 610; an ABS 620; a deep, ID channel 630; a deep, OD channel 632; a deep, central channel 634; a deep, ID etch pocket 640; a deep, OD etch pocket 642; shallow, TE etch pockets 650; a shallow, ID etch pocket 651; a shallow, OD etch pocket 652; a shallow, central LE etch pocket 656; a shallow, central TE etch pocket 658; and the lubricant-accumulation barrier 660.

With further reference to FIG. 6A, in accordance with embodiments of the present invention, the positive-air-pressure portion of the slider 600 may include, without limitation, the ABS 620. The ABS 620 may further include, without limitation, the following portions: a TE center pad 620a; a TE ID rail 620b; a TE OD rail 620c; an ID, ABS-connecting portion 620d; an OD, ABS-connecting portion 620e; a LE OD pad 620f; a LE ID pad 620g; and, a LE OD rail 620h. A portion of the LE ID pad 620g may include a LE ID-rail portion; and, a portion of the LE OD pad 620f may include a LE OD-rail portion. The positive-air-pressure portion generates a positive air pressure that creates a fluid-dynamic air-bearing that serves to levitate the slider 600 over a rotating magnetic-recording disk, for example, similar to the magnetic-recording disk 120, during operation of an HDD, for example, similar to the HDD 100.

With further reference to FIG. 6A, in accordance with embodiments of the present invention, the negative-air-pressure portion of the slider 600 may include, without limitation, the following portions: the deep, ID channel 630; the deep, OD channel 632; the deep, central channel 634; the deep, ID etch pocket 640; the deep, OD etch pocket 642; the shallow, TE etch pockets 650; the shallow, ID etch pocket 651; the shallow, OD etch pocket 652; the shallow, central LE etch pocket 656; and, the shallow, central TE etch pocket 658. The shallow, TE etch pockets 650 may further include a shallow, TE ID etch pocket 650a and a shallow, TE OD etch pocket 650b. The shallow, LE recess 610 may further include a shallow, LE ID recess 610a and a shallow, LE OD recess 610b. The negative-air-pressure portion generates a negative air pressure that serves to bring the slider 600 into close proximity of the surface of the rotating magnetic-recording disk during operation of the HDD.

With further reference to FIG. 6A, in accordance with embodiments of the present invention, the lubricant-accumulation barrier 660 may include a plurality of lubricant-accumulation-barrier portions. As shown in FIG. 6A, the lubricant-accumulation barrier 660 includes, without limitation, the following lubricant-accumulation-barrier portions: a TE ID lubricant-accumulation-barrier portion 660a; and a TE OD lubricant-accumulation-barrier portion 660b. As is shown in FIG. 6A, the overall shape and area of TE ID lubricant-accumulation-barrier portion 660a is about equal to the overall shape and area of a center-line reflection (not shown) of the TE OD lubricant-accumulation-barrier portion 660b defined by the reflection of the TE OD lubricant-accumulation-barrier portion 660b within the plane of the disk-facing side of the slider 600 across a center-line running from the LE to the TE of the slider 600. Thus, the TE ID lubricant-accumulation-barrier portion 660a is congruent with the center-line reflection of the TE OD lubricant-accumulation-barrier portion 660b. Also, the TE ID lubricant-accumulation-barrier portion 660a and the TE OD lubricant-accumulation-barrier portion 660b are symmetrically disposed with respect to the TE center pad 620a of the ABS 620. The lubricant-accumulation-barrier portions may be disposed at a plurality of respective depths below an outer-most surface, which may be defined at the ABS 620, of the disk-facing side of the slider 600. As shown in FIG. 6A, the depth below the ABS 620 of TE ID lubricant-accumulation-barrier portion 660a is about the same as the depth below the ABS 620 of the TE OD lubricant-accumulation-barrier portion 660b. As further shown in FIG. 6A, the lubricant-accumulation barrier 660 may be continuous from the OD side 604 of the slider 600 to the ID side 602 of the slider 600.

Figure 6B:
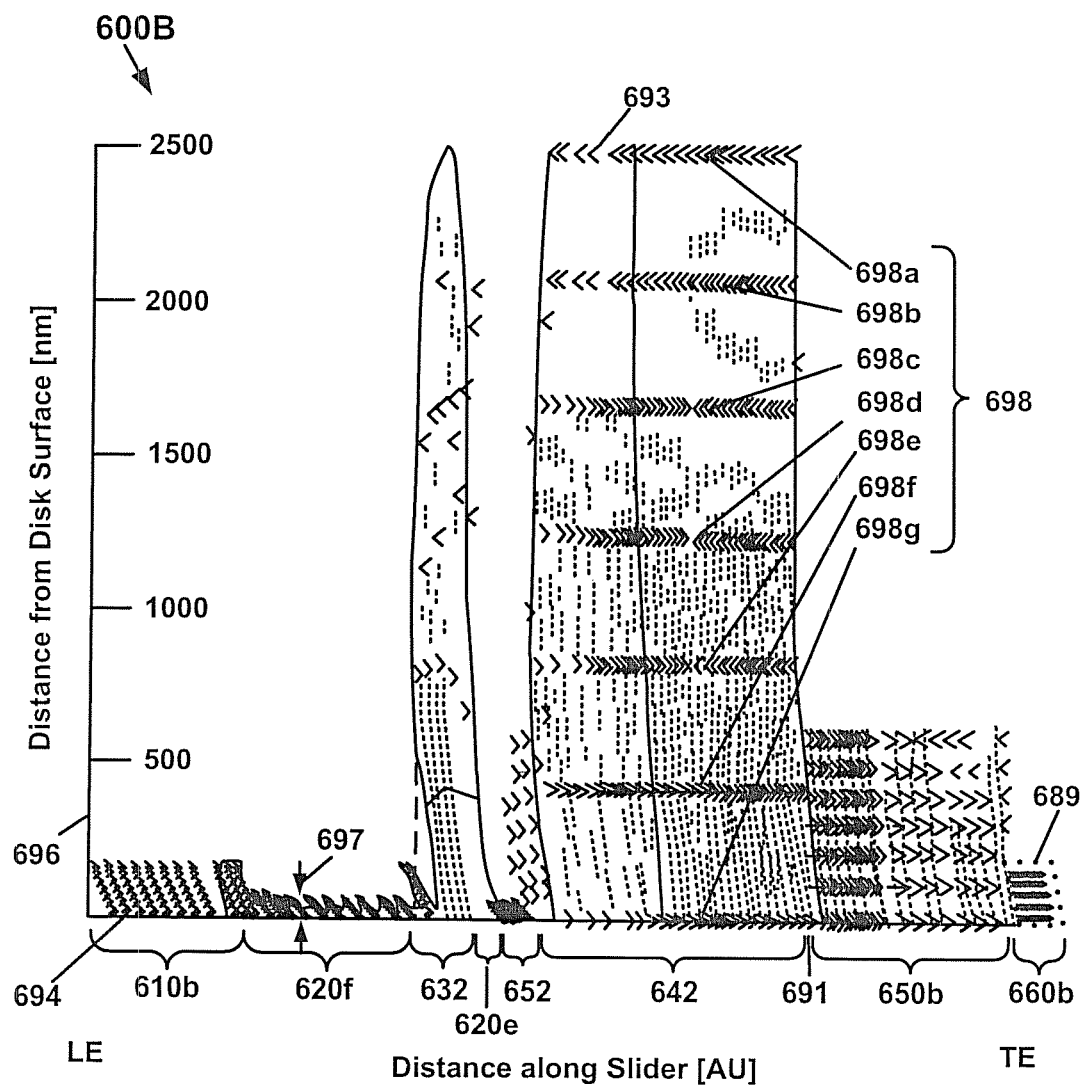
FIG. 6B is a vector-flow diagram through a vertical slice along line 6B-6B of FIG. 6A that is used to model an airflow pattern in a vertical air-column between the disk-facing slider-surface and a surface of a magnetic-recording disk in the simulation of airflow conditions that reduce lubricant accumulation at the shallow, TE etch pockets on the disk-facing slider-surface, in accordance with an embodiment of the present invention.

With reference now to FIG. 6B, in accordance with alternative embodiments of the present invention, a vector-flow diagram through a vertical slice along line 6B-6B of FIG. 6A of the slider 600 is shown. FIG. 6B models an airflow pattern 698 in a vertical air-column between the disk-facing slider-surface of the slider 600 and a surface of the magnetic-recording disk. The results of the model are used to simulate airflow conditions that may lead to lubricant accumulation on the shallow, TE OD etch pocket 650b of the disk-facing slider-surface. The airflow pattern 698 in the vertical air-column between the disk-facing slider-surface and the surface of a magnetic-recording disk includes a plurality of airflow contours 698a-698g equally spaced between the disk-facing slider-surface and the surface of the magnetic-recording disk. The airflow contours 698a-698g are plotted as a function of abscissa 694 that is the distance along the slider 600 in arbitrary units, similar to abscissa 394 of FIG. 3C. Thus, position along the slider 600 along line 6B-6B is given relative to the location of portions of the disk-facing slider-surface, given as follows starting from the LE and proceeding to the TE: the shallow, LE OD recess 610b; the LE OD pad 620f; the deep, OD channel 632; the OD, ABS-connecting portion 620e; the shallow, OD etch pocket 652; the deep, OD etch pocket 642; the shallow, TE OD etch pocket 650b; and, the TE OD lubricant-accumulation-barrier portion 660b.

With further reference to FIG. 6B, ordinate 696, for which the airflow contours 698a-698g are plotted, is the distance of the airflow contour from the disk surface, which is the surface of the rotating magnetic-recording disk; the distance from the disk surface is given in units of nanometers (nm). As the distance between the disk-facing slider-surface and the surface of the rotating magnetic-recording disk varies with location of the vertical air-column over a particular portion of the disk-facing slider-surface, the distance of a given airflow contour from the disk surface varies with the location of the vertical air-column over a particular portion of the disk-facing slider-surface, because the airflow contours 698a-698g are equally spaced between the disk-facing slider-surface and the surface of the magnetic-recording disk. The distance along the ordinate is about equal to the depth below the outer-most surface of the disk-facing side differing only by the fly height of the slider 600 at the location of a given portion of the disk-facing side of the slider 600 used to label abscissa 694. For example, although not shown precisely to scale in FIG. 6B, the distance of portions of the disk-facing slider-surface from the surface of the magnetic-recording disk is about the same as the height of airflow contour 698a, which is greater than the depth of portions of the disk-facing slider-surface below the outer-most surface of the disk-facing side of the slider 600 by the fly height of the slider 600 at the location of a given portion. The depths of portions of the disk-facing slider-surface below the outer-most surface of the disk-facing side of the slider 600 are as follows: for the shallow, LE OD recess 610b, about 150 nm; the LE OD pad 620f of the ABS 620, about 0 nm; the deep, OD channel 632, about 2500 nm; the OD, ABS-connecting portion 620e, about 0 nm; the shallow, OD etch pocket 652, about 800 nm; the deep, OD etch pocket 642, about 2500 nm; the shallow, TE OD etch pocket 650b, about 800 nm; and, the TE OD lubricant-accumulation-barrier portion 660b, about 150 nm. A portion of the disk-facing slider-surface shown in FIG. 6A with the same gray-tone as a portion used to label abscissa 694 in FIG. 6B may have about the same depth below the outer-most surface of the disk-facing side of the slider 600 as the portion used to label abscissa 694.

For example, and with further reference to FIG. 6B, airflow contour 698a includes the plurality of directions of airflow for given points in close proximity to the disk-facing slider-surface; each direction of airflow for a given point in close proximity to the disk-facing slider-surface is given by each arrow-head of a component of an airflow vector directed along line 6B-6B of FIG. 6A at each point along the line 6B-6B. For example, arrow-head 693 is an arrow-head of a component of an airflow vector directed along line 6B-6B at a point located at about three quarters of the length of the deep, OD etch pocket 642 along the line 6B-6B in the direction of the LE from side-wall 691 between the shallow, TE OD etch pocket 650b and the deep, OD etch pocket 642. In this manner, airflow contour 698a gives the directions of airflow directed along the direction of line 6B-6B at the projection of each point along the line 6B-6B onto and in close proximity to the disc-facing slider-surface of the slider 600. Similarly, airflow contour 698g gives the directions of airflow directed along the direction of line 6B-6B at the projection of each point along the line 6B-6B onto and in close proximity to a surface of a rotating magnetic-recording disk. Airflow contours 698b-698f give the directions of airflow directed along the direction of line 6B-6B at points in the vertical air-column over each point along the line 6B-6B equally spaced between the disk-facing slider-surface and the surface of the magnetic-recording disk, respectively.

With further reference to FIG. 6B, in accordance with alternative embodiments of the present invention, the distance from the disk surface includes the fly height, which varies linearly decreasingly from about 100 nm at the LE to about 10 nm at the TE, and the distance the disk-facing slider-surface lies below a top datum surface of the slider 600, which is an outer-most surface of the disk-facing side of the slider 600. The fly height is defined as the separation distance between the ABS 620 and the disk surface; for example, the fly height at a point located at about one third of the way into the LE OD pad 620f of the ABS 620 along line 6B-6B in the direction proceeding from the LE towards the TE is designated by the pair of arrows 697. The distance that a portion of the disk-facing slider-surface lies below the ABS 620 is the distance from the disk surface of the portion of disk-facing slider-surface less the fly-height at the corresponding point of the line 6B-6B. For airflow contour 698a, this means that at the TE position along abscissa 694 the distance from the disk surface to the disk-facing slider-surface is about the same as the distance from the datum plane of the ABS 620 to the disk-facing slider-surface, being only about 10 nm more than the distance from the datum plane of the ABS 620.

With further reference to FIG. 6B, in accordance with alternative embodiments of the present invention, the results of the model simulate the airflow conditions that may lead to lubricant accumulation on the shallow, TE OD etch pocket 650b of the disk-facing slider-surface. At the TE over the TE OD lubricant-accumulation-barrier portion 660b, the model predicts that there is located a region 689 of reduced, or negligible, reverse airflow, compared with the region 389 of reverse airflow over the slider 300 that produces lubricant accumulation 380, in the vertical air-column between the disk-facing slider-surface of the slider 600 and the surface of a magnetic-recording disk, as indicated by the numerous arrow-heads of the airflow contours 698a-698g that point in the direction of the TE. Thus, the lubricant-accumulation barrier 660, as well as the component portions of the lubricant-accumulation barrier 660, the TE ID lubricant-accumulation-barrier portion 660a and the TE OD lubricant-accumulation-barrier portion 660b, is configured to reduce reverse airflow over the lubricant-accumulation barrier 660 and portions thereof 660a and 660b. In accordance with embodiments of the present invention, the lubricant-accumulation barrier 660 and individual lubricant-accumulation-barrier portions 660a and 660b may have a depth between about 150 nm and about 600 nm below an outer-most surface of a disk-facing side of the slider 600. For example, the lubricant-accumulation-barrier portions 660a and 660b are about 600 nm above the surface of the magnetic-recording disk; if the nominal fly height at the TE is taken into account, lubricant-accumulation-barrier portions 660a and 660b have a depth about 590 nm below the ABS 620, which may be taken as the outer-most surface of the disk-facing side of the slider 600. As shown in FIG. 6A, the lubricant-accumulation barrier 660 is continuous from the OD side 604 of the slider 600 to the ID side 602 of the slider 600. Because the lubricant-accumulation barrier 660 is continuous from the OD side 604 of the slider 600 to the ID side 602 of the slider 600, there are no openings created for reverse airflow around the "lube dam," so that reverse flow of lubricant from the disk enclosure (DE) is prevented by the absence of openings in the "lube dam" for reverse airflow. Whether to choose a continuous lubricant-accumulation barrier, such as continuous lubricant-accumulation barrier 660, as for the slider design shown in FIG. 6A, or a discontinuous lubricant-accumulation barrier, such as discontinuous lubricant-accumulation barriers 460 or 560, as for the slider designs shown in FIGS. 4A and 5A, respectively, is determined by the trade-offs between the reduction of lubricant accumulation and ABS flight characteristics of a slider, which is an area of continuing research by the inventor and design discretion for future slider designers.

Figure 7A:
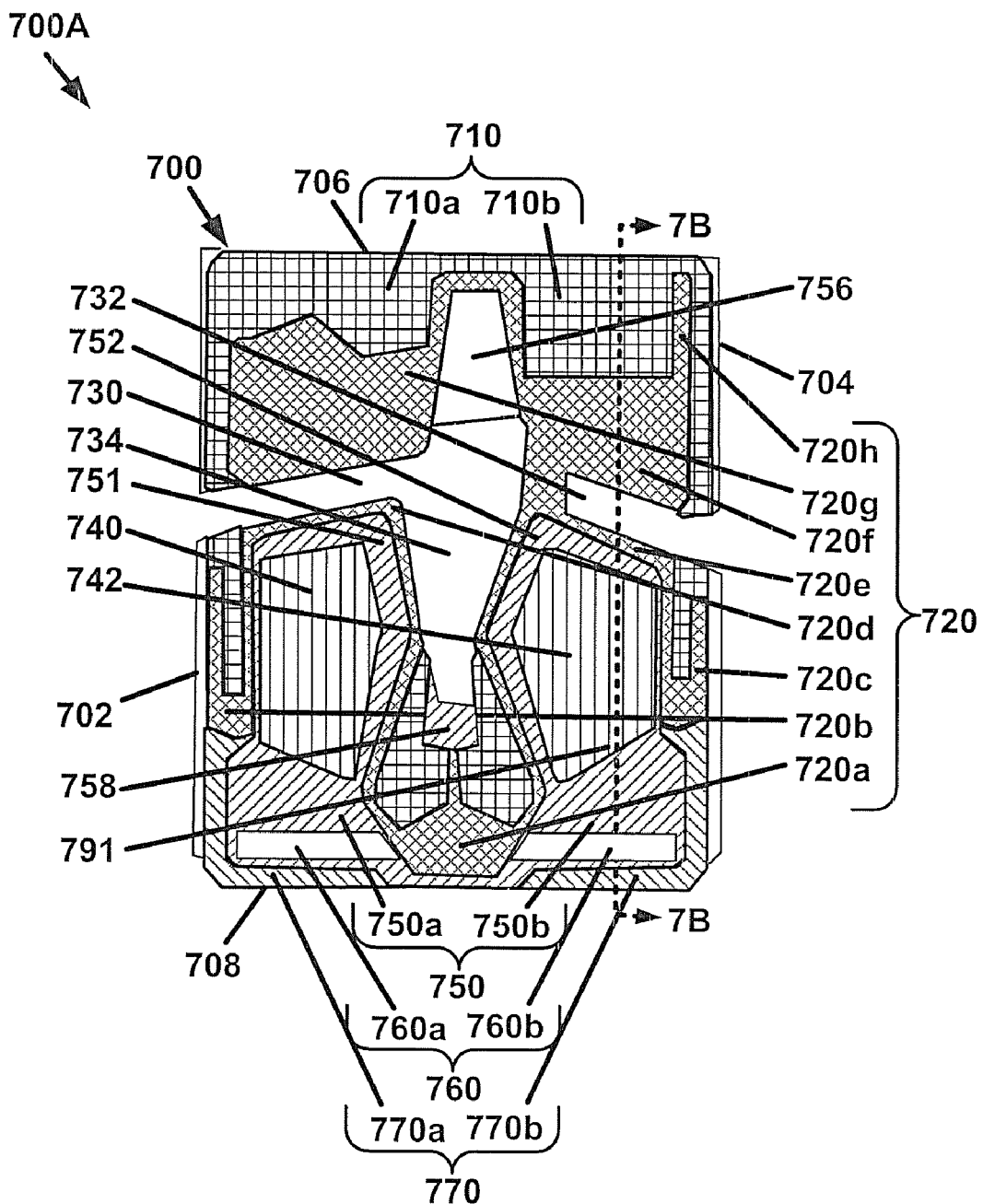
FIG. 7A is a topographical plan view of a disk-facing slider-surface of a design for a slider including a lubricant-accumulation barrier including a plurality of lubricant-accumulation-barrier portions that reduce lubricant accumulation at shallow, TE etch pockets on the disk-facing slider-surface, in accordance with an embodiment of the present invention.

With reference now to FIG. 7A, in accordance with alternative embodiments of the present invention, a topographical plan view 700A of a disk-facing slider-surface of a slider 700 is shown. The slider 700 has the shape of a substantially rectangular parallelepiped. The slider 700 includes six sides: an ID side 702; an OD side 704; a LE side 706; a TE side 708; a gimbal-facing side (not shown); and, the disk-facing side as shown in the topographical plan view 700A of FIG. 7A. The slider 700 is resistant to lubricant accumulation. The slider 700 includes a positive-air-pressure portion configured to levitate the slider 700 above a magnetic-recording disk, for example, similar to the magnetic-recording disk 120. The slider 700 includes a magnetic-recording head, for example, similar to the magnetic-recording head 110a as described above. Tile slider 700 also includes a negative-air-pressure portion configured to bring the slider 700 into proximity with the magnetic-recording disk at a fly height sufficient for writing data to and reading data from the magnetic-recording disk by the magnetic-recording head. In addition, the slider 700 includes a lubricant-accumulation barrier, including a plurality of lubricant-accumulation-barrier portions, disposed in proximity to a TE of the slider 700; the lubricant-accumulation barrier, including the plurality of lubricant-accumulation-barrier portions, is configured to reduce lubricant accumulation on the slider 700, especially at shallow, TE etch pockets 750 on the disk-facing slider-surface. The plurality of lubricant-accumulation-barrier portions may include a first lubricant-accumulation-barrier portion 760 and a second lubricant-accumulation-barrier portion 770. The plurality of lubricant-accumulation-barrier portions may be disposed at a plurality of respective depths below an outer-most surface of a disk-facing side of the slider 700. In addition, the plurality of lubricant-accumulation-barrier portions may include a lower lubricant-accumulation-barrier portion; and, the plurality of lubricant-accumulation-barrier portions may include an upper lubricant-accumulation-barrier portion. The first lubricant-accumulation-barrier portion 760 may be a lower lubricant-accumulation-barrier portion without limitation thereto; and, the second lubricant-accumulation-barrier portion 770 may be an upper lubricant-accumulation-barrier portion, without limitation thereto. The disk-facing slider-surface of the slider 700 may include, without limitation, the following portions: a shallow, LE recess 710; an ABS 720; a deep, ID channel 730; a deep, OD channel 732; a deep, central channel 734; a deep, ID etch pocket 740; a deep, OD etch pocket 742; shallow, TE etch pockets 750; a shallow, ID etch pocket 751; a shallow, OD etch pocket 752; a shallow, central LE etch pocket 756; a shallow, central TE etch pocket 758; and the lubricant-accumulation barrier, including the first lubricant-accumulation-barrier portion 760 and the second lubricant-accumulation-barrier portion 770.

With further reference to FIG. 7A, in accordance with embodiments of the present invention, the positive-air-pressure portion of the slider 700 may include, without limitation, the ABS 720. The ABS 720 may further include, without limitation, the following portions: a TE center pad 720a; a TE ID rail 720b; a TE OD rail 720c; an ID, ABS-connecting portion 720d; an OD, ABS-connecting portion 720e; a LE OD pad 720f; a LE ID pad 720g; and, a LE OD rail 720h. A portion of the LE ID pad 720g may include a LE ID-rail portion; and, a portion of the LE OD pad 720f may include a LE OD-rail portion. The positive-air-pressure portion generates a positive air pressure that creates a fluid-dynamic air-bearing that serves to levitate the slider 700 over a rotating magnetic-recording disk, for example, similar to the magnetic-recording disk 120, during operation of an HDD, for example, similar to the HDD 100.

With further reference to FIG. 7A, in accordance with embodiments of the present invention, the negative-air-pressure portion of the slider 700 may include, without limitation, the following portions: the deep, ID channel 730; the deep, OD channel 732; the deep, central channel 734; the deep, ID etch pocket 740; the deep, OD etch pocket 742; the shallow, TE etch pockets 750; the shallow, ID etch pocket 751; the shallow, OD etch pocket 752; the shallow, central LE etch pocket 756; and, the shallow, central TE etch pocket 758. The shallow, TE etch pockets 750 may further include a shallow, TE ID etch pocket 750a and a shallow, TE OD etch pocket 750b. The shallow, LE recess 710 may further include a shallow, LE ID recess 710a and a shallow, LE OD recess 710b. The negative-air-pressure portion generates a negative air pressure that serves to bring the slider 700 into close proximity of the surface of the rotating magnetic-recording disk during operation of the HDD.

With further reference to FIG. 7A, in accordance with embodiments of the present invention, the lubricant-accumulation barrier includes a plurality of lubricant-accumulation-barrier portions: the first lubricant-accumulation-barrier portion 760 and the second lubricant-accumulation-barrier portion 770. As shown in FIG. 7A, the first lubricant-accumulation-barrier portion 760 includes, without limitation, the following lubricant-accumulation-barrier portions: a first TE ID lubricant-accumulation-barrier portion 760a; and a first TE OD lubricant-accumulation-barrier portion 760b. As is shown in FIG. 7A, the overall shape and area of first TE ID lubricant-accumulation-barrier portion 760a is about equal to the overall shape and area of a center-line reflection (not shown) of the first TE OD lubricant-accumulation-barrier portion 760b defined by the reflection of the first TE OD lubricant-accumulation-barrier portion 760b within the plane of the disk-facing side of the slider 700 across a center-line running from the LE to the TE of the slider 700. Thus, the first TE ID lubricant-accumulation-barrier portion 760a is congruent with the center-line reflection of the first TE OD lubricant-accumulation-barrier portion 760b. Also, the first TE ID lubricant-accumulation-barrier portion 760a and the first TE OD lubricant-accumulation-barrier portion 760b are symmetrically disposed with respect to the TE center pad 720a of the ABS 720. As shown in FIG. 7A, the second lubricant-accumulation-barrier portion 770 includes, without limitation, the following lubricant-accumulation-barrier portions: a second TE ID lubricant-accumulation-barrier portion 770a; and a second TE OD lubricant-accumulation-barrier portion 770b. Similarly, the overall shape and area of second TE ID lubricant-accumulation-barrier portion 770a is about equal to the overall shape and area of a center-line reflection (not shown) of the second TE OD lubricant-accumulation-barrier portion 770b defined by the reflection of the second TE OD lubricant-accumulation-barrier portion 770b within the plane of the disk-facing side of the slider 700 across a center-line running from the LE to the TE of the slider 700. Thus, the second TE ID lubricant-accumulation-barrier portion 770a is congruent with the center-line reflection of the second TE OD lubricant-accumulation-barrier portion 770b. Also, the second TE ID lubricant-accumulation-barrier portion 770a and the second TE OD lubricant-accumulation-barrier portion 770b are symmetrically disposed with respect to the TE center pad 720a of the ABS 720. In addition, the plurality of lubricant-accumulation-barrier portions includes the first lubricant-accumulation-barrier portion 760 and the second lubricant-accumulation-barrier portion 770 such that the second lubricant-accumulation-barrier portion 770 is discontinuous from the OD side 704 of the slider 700 to the ID side 702 of the slider 700. The second lubricant-accumulation-barrier portion 770 is disposed closer to the trailing edge of the slider 700 than the first lubricant-accumulation-barrier portion 760. The second lubricant-accumulation-barrier portion 770 and the first lubricant-accumulation-barrier portion 760 may also be configured to reduce crossover-transfer of lubricant between an OD TE portion of the slider 700 and an ID TE portion of the slider 700.

With further reference to FIG. 7A, in accordance with embodiments of the present invention, the lubricant-accumulation-barrier portions may be disposed at a plurality of respective depths below an outer-most surface, which may be defined at the ABS 720, of the disk-facing side of the slider 700. As shown in FIG. 7A, the depth below the ABS 720 of first TE ID lubricant-accumulation-barrier portion 760a is about the same as the depth below the ABS 720 of the first TE OD lubricant-accumulation-barrier portion 760b. As shown in FIG. 7A, the depth below the ABS 720 of second TE ID lubricant-accumulation-barrier portion 770a is about the same as the depth below the ABS 720 of the second TE OD lubricant-accumulation-barrier portion 770b. However, for the slider design of FIG. 7A, the plurality of lubricant-accumulation-barrier portions includes a lower lubricant-accumulation-barrier portion that has a depth of about 600 nm below the outer-most surface of the disk-facing side of the slider 700 and an upper lubricant-accumulation-barrier portion that has a depth between about 150 nm and about 600 nm below the outer-most surface of the disk-facing side of the slider 700. Specifically, as is next shown in FIG. 7B, the first lubricant-accumulation-barrier portion 760 serves as an lower lubricant-accumulation-barrier portion and has a depth about 600 nm below the outer-most surface of the disk-facing side of the slider 700; and, the second lubricant-accumulation-barrier portion 770 serves as an upper lubricant-accumulation-barrier portion and has a depth of about 150 nm below the outer-most surface of the disk-facing side of the slider 700.

Figure 7B:
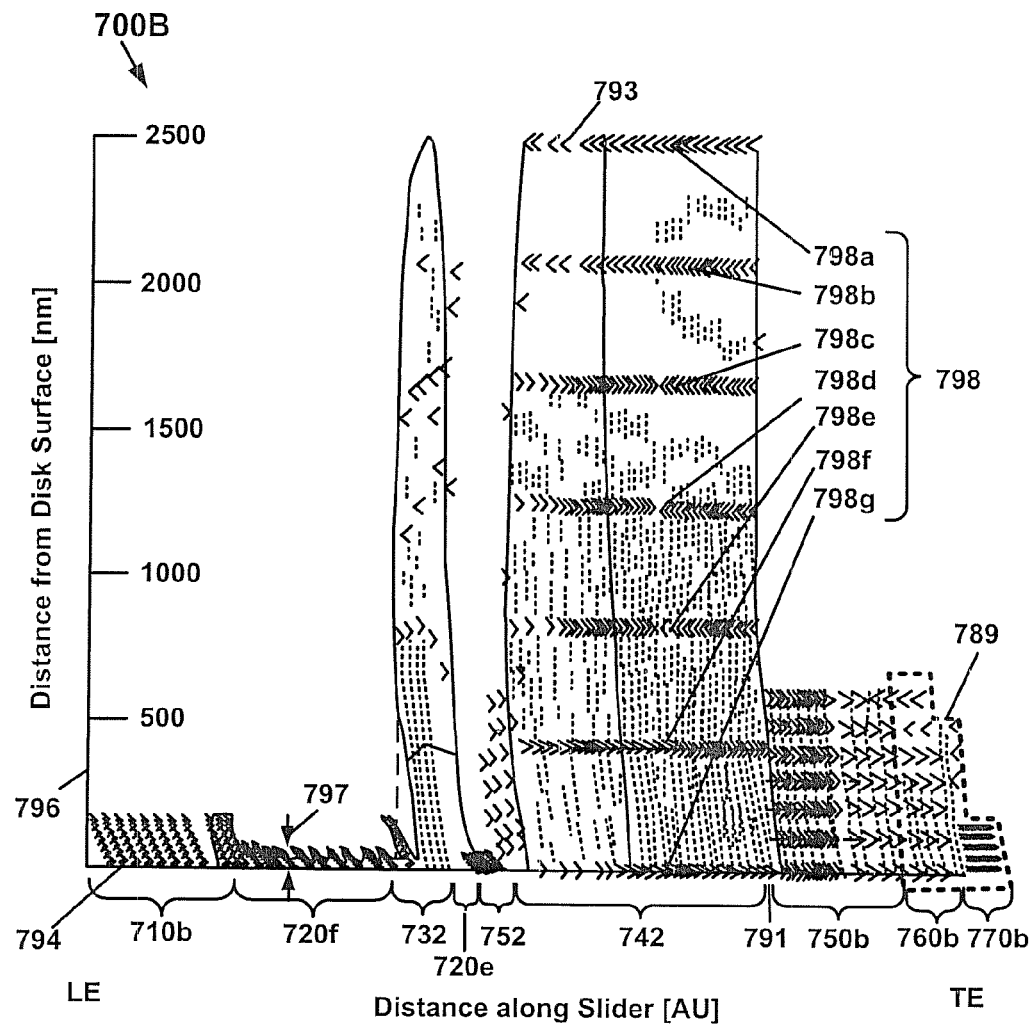
FIG. 7B is a vector-flow diagram through a vertical slice along line 7B-7B of FIG. 7A that is used to model an airflow pattern in a vertical air-column between the disk-facing slider-surface and a surface of a magnetic-recording disk in the simulation of airflow conditions that reduce lubricant accumulation at the shallow, TE etch pockets on the disk-facing slider-surface, in accordance with an embodiment of the present invention.

With reference now to FIG. 7B, in accordance with alternative embodiments of the present invention, a vector-flow diagram 700B through a vertical slice along line 7B-7B of FIG. 7A of the slider 700 is shown. FIG. 7B models an airflow pattern 798 in a vertical air-column between the disk-facing slider-surface of the slider 700 and a surface of the magnetic-recording disk. The results of the model are used to simulate airflow conditions that may lead to lubricant accumulation on the shallow, TE OD etch pocket 750b of the disk-facing slider-surface. The airflow pattern 798 in the vertical air-column between the disk-facing slider-surface and the surface of a magnetic-recording disk includes a plurality of airflow contours 798a-798g equally spaced between the disk-facing slider-surface and the surface of the magnetic-recording disk. The airflow contours 798a-798g are plotted as a function of abscissa 794 that is distance along the slider 700 in arbitrary units, similar to abscissa 394 of FIG. 3C. Thus, position along the slider 700 along line 7B-7B is given relative to the location of portions of the disk-facing slider-surface, given as follows starting from the LE and proceeding to the TE: the shallow, LE OD recess 710b; the LE OD pad 720f; the deep, OD channel 732; the OD, ABS-connecting portion

720e; the shallow, OD etch pocket 752; the deep, OD etch pocket 742; the shallow, TE OD etch pocket 750b of the TE; the first TE OD lubricant-accumulation-barrier portion 760b; and, the second TE OD lubricant-accumulation-barrier portion 770b.

With further reference to FIG. 7B, ordinate 796, for which the airflow contours 798a-798g are plotted, is the distance of the airflow contour from the disk surface, which is the surface of the rotating magnetic-recording disk; the distance from the disk surface is given in units of nanometers (nm). As the distance between the disk-facing slider-surface and the surface of the rotating magnetic-recording disk varies with location of the vertical air-column over a particular portion of the disk-facing slider-surface, the distance of a given airflow contour from the disk surface varies with the location of the vertical air-column over a particular portion of the disk-facing slider-surface, because the airflow contours 798a-798g are equally spaced between the disk-facing slider-surface and the surface of the magnetic-recording disk. The distance along the ordinate is about equal to the depth below the outer-most surface of the disk-facing side differing only by the fly height of the slider 700 at the location of a given portion of the disk-facing side of the slider 700 used to label abscissa 794. For example, although not shown precisely to scale in FIG. 7B, the distance of portions of the disk-facing slider-surface from the surface of the magnetic-recording disk is about the same as the height of airflow contour 798a, which is greater than the depth of portions of the disk-facing slider-surface below the outer-most surface of the disk-facing side of the slider 700 by the fly height of the slider 700 at the location of a given portion. The depths of portions of the disk-facing slider-surface below the outer-most surface of the disk-facing side of the slider 700 are as follows: for the shallow, LE OD recess 710b, about 150 nm; the LE OD pad 720f, about 0 nm; the deep, OD channel 732, about 2500 nm; the OD, ABS-connecting portion 720e, about 0 nm; the shallow, OD etch pocket 752, about 800 nm; the deep, OD etch pocket 742, about 2500 nm; the shallow, TE OD etch pocket 750b, about 800 nm; the first TE OD lubricant-accumulation-barrier portion 760b, about 600 nm; and, the second TE OD lubricant-accumulation-barrier portion 770b, about 150 nm. A portion of the disk-facing slider-surface shown in FIG. 7A with the same gray-tone as a portion used to label abscissa 794 in FIG. 7B may have about the same depth below the outer-most surface of the disk-facing side of the slider 700 as the portion used to label abscissa 794.

For example, and with further reference to FIG. 7B, airflow contour 798a includes the plurality of directions of airflow for given points in close proximity to the disk-facing slider-surface; each direction of airflow for a given point in close proximity to the disk-facing slider-surface is given by each arrow-head of a component of an airflow vector directed along line 7B-7B of FIG. 7A at each point along the line 7B-7B. For example, arrow-head 793 is an arrow-head of a component of an airflow vector directed along line 7B-7B at a point located at about four fifths of the length of the deep, OD etch pocket 742 along the line 7B-7B in the direction of the LE from side-wall 791 between the shallow, TE OD etch pocket 750b and the deep, OD etch pocket 742. In this manner, airflow contour 798a gives the directions of airflow directed along the direction of line 7B-7B at the projection of each point along the line 7B-7B onto and in close proximity to the disk-facing slider-surface of the slider 700. Similarly, airflow contour 798g gives the directions of airflow directed along the direction of line 7B-7B at the projection of each point along the line 7B-7B onto and in close proximity to a surface of a rotating magnetic-recording disk. Airflow contours 798b-798f give the directions of airflow directed along the direction of line 7B-7B at points in the vertical air-column over each point along the line 7B-7B equally spaced between the disk-facing slider-surface and the surface of the magnetic-recording disk, respectively.

With further reference to FIG. 7B, in accordance with alternative embodiments of the present invention, the distance from the disk surface includes the fly height, which varies linearly decreasingly from about 100 nm at the LE to about 10 nm at the TE, and the distance the disk-facing slider-surface lies below a top datum surface of the slider 700, which is an outer-most surface of the disk-facing side of the slider 700. The fly height is defined as the separation distance between the ABS 720 and the disk surface; for example, the fly height at a point located at about one third of the way into the LE OD pad 720f of the ABS 720 along line 7B-7B in the direction proceeding from the LE towards the TE is designated by the pair of arrows 797. The distance that a portion of the disk-facing slider-surface lies below the ABS 720 is the distance from the disk surface of the portion of disk-facing slider-surface less the fly-height at the corresponding, point of the line 7B-7B. For airflow contour 798a, this means that at the TE position along abscissa 794 the distance from the disk surface to the disk-facing slider-surface is about the same as the distance from the datum plane of the ABS 720 to the disk-facing slider-surface, being only about 10 nm more than the distance from the datum plane of the ABS 720.

With further reference to FIG. 7B, in accordance with alternative embodiments of the present invention, the results of the model simulate the airflow conditions that may lead to lubricant accumulation on the shallow, TE OD etch pocket 750b of the disk-facing slider-surface. At the TE over the first TE OD lubricant-accumulation-barrier portion 760b, the model predicts that there is located a region 789 of reduced, or negligible, reverse airflow, compared with the region 389 of reverse airflow over the slider 300 that produces lubricant accumulation 380, in the vertical air-column between the disk-facing slider-surface of the slider 700 and the surface of a magnetic-recording disk, as indicated by the numerous arrow-heads of the airflow contours 798a-798g that point in the direction of the TE. Thus, the lubricant-accumulation barrier, including first and second lubricant-accumulation-barrier portions 760 and 770, respectively, as well as the component portions 760a, 760b, 770a and 770b of the lubricant-accumulation barrier, are configured to reduce reverse airflow over the lubricant-accumulation barrier, including first and second lubricant-accumulation-barrier portions 760 and 770, respectively, and portions thereof 760a, 760b, 770a and 770b. In accordance with embodiments of the present invention, the first lubricant-accumulation barrier 760 and individual first lubricant-accumulation-barrier portions 760a and 760b may have a depth between about 150 nm and about 600 nm below an outer-most surface of a disk-facing side of the slider 700. For example, the first lubricant-accumulation-barrier portions 760a and 760b are about 600 nm above the surface of the magnetic-recording disk; if the nominal fly height at the TE is taken into account, first lubricant-accumulation-barrier portions 760a and 760b have a depth about 590 nm below the ABS 720, which may be taken as the outer-most surface of the disk-facing side of the slider 700. Similarly, the second lubricant-accumulation barrier 770 and individual second lubricant-accumulation-barrier portions 770a and 770b may have a depth between about 150 nm and about 600 nm below an outer-most surface of a disk-facing side of the slider 700. For example, the second lubricant-accumulation-barrier portions 770a and 770b are about 150 nm above the surface of the magnetic-recording disk; if the nominal fly height at the TE is taken into account, second lubricant-accumulation-barrier portions 770a and 770b have a depth about 140 nm below the ABS 720. As shown in FIG. 7A, the first lubricant-accumulation barrier 760 is discontinuous from the OD side 704 of the slider 700 to the ID side 702 of the slider 700. Similarly, the second lubricant-accumulation barrier 770 is discontinuous from the OD side 704 of the slider 700 to the ID side 702 of the slider 700. For the slider design of FIG. 7A, the addition of both the first lubricant-accumulation-barrier portion 760 and the second lubricant-accumulation-barrier portion 770 to the slider 700 create a structure of "dual lube dams" that eliminates all reverse airflow on the TE portions of the slider 700 from the TE center pad 720a to the OD side 704 of the slider 700; but, the TE portions of the slider 700 from about the TE center pad 720a to the ID side 702 of the slider 700 still exhibit some reverse airflow. In addition, for the slider design of FIG. 7A, the "dual lube dams" provide a lubricant-accumulation barrier that acts as a barrier to crossover-transfer of lubricant along the TE from one side to the other of the slider 700, from the OD side 704 to the ID side 702, or alternatively from the ID side 702 to the OD side 704, of the slider 700.

Figure 8A:
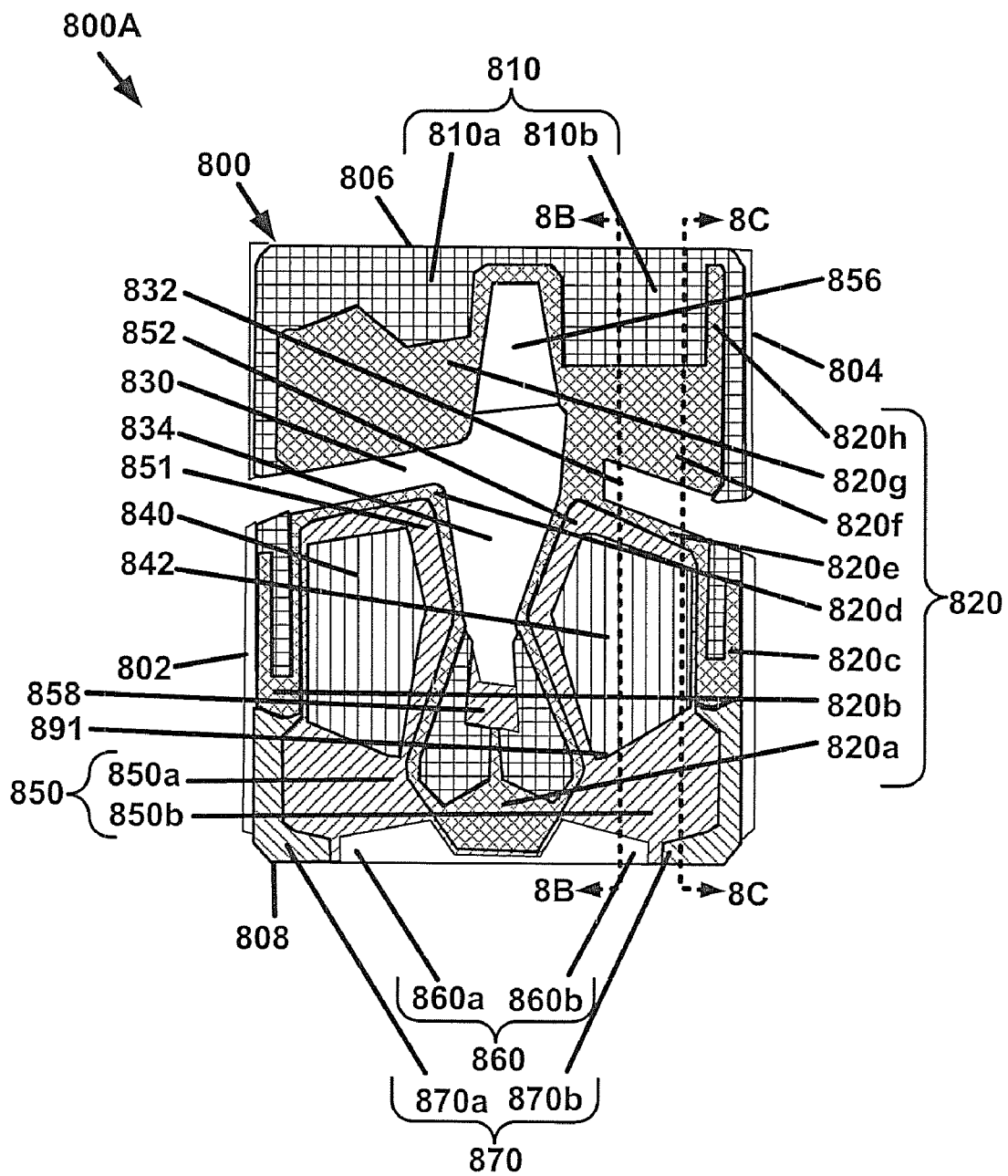
FIG. 8A is a topographical plan view of a disk-facing slider-surface of an alternative design for a slider including a lubricant-accumulation barrier including a plurality of lubricant-accumulation-barrier portions that reduce lubricant accumulation at shallow, TE etch pockets on the disk-facing slider-surface, in accordance with an embodiment of the present invention.

With reference now to FIG. 8A, in accordance with alternative embodiments of the present invention, a topographical plan view 800A of a disk-facing slider-surface of a slider 800 is shown. The slider 800 has the shape of a substantially rectangular parallelepiped. The slider 800 includes six sides: an ID side 802; an OD side 804; a LE side 806; a TE side 808; a gimbal-facing side (not shown); and, the disk-facing side as shown in the topographical plan view 800A of FIG. 8A. The slider 800 is resistant to lubricant accumulation. The slider 800 includes a positive-air-pressure portion configured to levitate the slider 800 above a magnetic-recording disk, for example, similar to the magnetic-recording disk 120. The slider 800 includes a magnetic-recording head, for example, similar to the magnetic-recording head 110a as described above. The slider 800 also includes a negative-air-pressure portion configured to bring the slider 800 into proximity with the magnetic-recording disk at a fly height sufficient for writing data to and reading data from the magnetic-recording disk by the magnetic-recording head. In addition, the slider 800 includes a lubricant-accumulation barrier, including a plurality of lubricant-accumulation-barrier portions, disposed in proximity to a TE of the slider 800; the lubricant-accumulation barrier, including a plurality of lubricant-accumulation-barrier portions, is configured to reduce lubricant accumulation on the slider 800, especially at shallow, TE etch pockets 850 on the disk-facing slider-surface. The plurality of lubricant-accumulation-barrier portions may include a first lubricant-accumulation-barrier portion 860 and a second lubricant-accumulation-barrier portion 870. The plurality of lubricant-accumulation-barrier portions may be disposed at a plurality of respective depths below an outer-most surface of a disk-facing side of the slider 800. In addition, the plurality of lubricant-accumulation-barrier portions may include a lower lubricant-accumulation-barrier portion; and, the plurality of lubricant-accumulation-barrier portions may include an upper lubricant-accumulation-barrier portion. The first lubricant-accumulation-barrier portion 860 may be a lower lubricant-accumulation-barrier portion without limitation thereto; and, the second lubricant-accumulation-barrier portion 870 may be an upper lubricant-accumulation-barrier portion, without limitation thereto. The disk-facing slider-surface of the slider 800 may include, without limitation, the following portions: a shallow, LE recess 810; an ABS 820; a deep, ID channel 830; a deep, OD channel 832; a deep, central channel 834; a deep, ID etch pocket 840; a deep, OD etch pocket 842; shallow, TE etch pockets 850; a shallow, ID etch pocket 851; a shallow, OD etch pocket 852; a shallow, central LE etch pocket 856; a shallow, central TE etch pocket 858; and the lubricant-accumulation barrier, including the first lubricant-accumulation-barrier portion 860 and the second lubricant-accumulation-barrier portion 870.

With further reference to FIG. 8A, in accordance with embodiments of the present invention, the positive-air-pressure portion of the slider 800 may include, without limitation, the ABS 820. The ABS 820 may further include, without limitation, the following portions: a TE center pad 820a; a TE ID rail 820b; a TE OD rail 820c; an ID, ABS-connecting portion 820d; an OD, ABS-connecting portion 820e; a LE OD pad 820f; a LE ID pad 820g; and, a LE OD rail 820h. A portion of the LE ID pad 820g may include a LE ID-rail portion; and, a portion of the LE OD pad 820f may include a LE OD-rail portion. The positive-air-pressure portion generates a positive air pressure that creates a fluid-dynamic air-bearing that serves to levitate the slider 800 over a rotating magnetic-recording disk, for example, similar to the magnetic-recording disk 120, during operation of an HDD, for example, similar to the HDD 100.

With further reference to FIG. 8A, in accordance with embodiments of the present invention, the negative-air-pressure portion of the slider 800 may include, without limitation, the following portions: the deep, ID channel 830; the deep, OD channel 832; the deep, central channel 834; the deep, ID etch pocket 840; the deep, OD etch pocket 842; the shallow, TE etch pockets 850; the shallow, ID etch pocket 851; the shallow, OD etch pocket 852; the shallow, central LE etch pocket 856; and, the shallow, central TE etch pocket 858. The shallow, TE etch pockets 850 may further include a shallow, TE ID etch pocket 850a and a shallow, TE OD etch pocket 850b. The shallow, LE recess 810 may further include a shallow, LE ID recess 810a and a shallow, LE OD recess 810b. The negative-air-pressure portion generates a negative air pressure that serves to bring the slider 800 into close proximity of the surface of the rotating magnetic-recording disk during operation of the HDD.

With further reference to FIG. 8A, in accordance with embodiments of the present invention, the lubricant-accumulation barrier includes a plurality of lubricant-accumulation-barrier portions: the first lubricant-accumulation-barrier portion 860 and the second lubricant-accumulation-barrier portion 870. As shown in FIG. 8A, the first lubricant-accumulation-barrier portion 860 includes, without limitation, the following lubricant-accumulation-barrier portions: a first TE ID lubricant-accumulation-barrier portion 860a; and a first TE OD lubricant-accumulation-barrier portion 860b. As is shown in FIG. 8A, the overall shape and area of first TE ID lubricant-accumulation-barrier portion 860a is about equal to the overall shape and area of a center-line reflection (not shown) of the first TE OD lubricant-accumulation-barrier portion 860b defined by the reflection of the first TE OD lubricant-accumulation-barrier portion 860b within the plane of the disk-facing side of the slider 800 across a center-line running from the LE to the TE of the slider 800. Thus, the first TE ID lubricant-accumulation-barrier portion 860a is congruent with the center-line reflection of the first TE OD lubricant-accumulation-barrier portion 860b. Also, the first TE ID lubricant-accumulation-barrier portion 860a and the first TE OD lubricant-accumulation-barrier portion 860b are symmetrically disposed with respect to the TE center pad 820a of the ABS 820. As shown in FIG. 8A, the second lubricant-accumulation-barrier portion 870 includes, without limitation, the following lubricant-accumulation-barrier portions: a second TE ID lubricant-accumulation-barrier portion 870a;

and a second TE OD lubricant-accumulation-barrier portion 870b. Similarly, the overall shape and area of second TE ID lubricant-accumulation-barrier portion 870a is about equal to the overall shape and area of a center-line reflection (not shown) of the second TE OD lubricant-accumulation-barrier portion 870b defined by the reflection of the second TE OD lubricant-accumulation-barrier portion 870b within the plane of the disk-facing side of the slider 800 across a center-line running from the LE to the TE of the slider 800. Thus, the second TE ID lubricant-accumulation-barrier portion 870a is congruent with the center-line reflection of the second TE OD lubricant-accumulation-barrier portion 870b. Also, the second TE ID lubricant-accumulation-barrier portion 870a and the second TE OD lubricant-accumulation-barrier portion 870b are symmetrically disposed with respect to the TE center pad 820a of the ABS 820. In addition, the plurality of lubricant-accumulation-barrier portions 860 and 870 includes a first lubricant-accumulation-barrier portion 860 and a second lubricant-accumulation-barrier portion 870 such that the second lubricant-accumulation-barrier portion 870 is discontinuous from the OD side 804 of the slider 800 to the ID side 802 of the slider 800. The first lubricant-accumulation-barrier portion 860 is disposed closer to the trailing edge of the slider 800 than the second lubricant-accumulation-barrier portion 870 over a portion of the slider proximate to a TE center pad 820a of the slider 800. The second lubricant-accumulation-barrier portion 870 is disposed closer to the trailing edge of the slider 800 over at least some portion of the slider 800 where the first lubricant-accumulation-barrier portion 860 is not already disposed. For example, the second lubricant-accumulation-barrier portion 870 may be disposed closer to the trailing edge of the slider 800 at the OD side 704 and the ID side 702 than the first lubricant-accumulation-barrier portion 860, as shown in FIG. 8A.

With further reference to FIG. 8A, in accordance with embodiments of the present invention, the lubricant-accumulation-barrier portions may be disposed at a plurality of respective depths below an outer-most surface, which may be defined at the ABS 820, of the disk-facing side of the slider 800. As shown in FIG. 8A, the depth below the ABS 820 of first TE ID lubricant-accumulation-barrier portion 860a is about the same as the depth below the ABS 820 of the first TE OD lubricant-accumulation-barrier portion 860b. As shown in FIG. 8A, the depth below the ABS 820 of second TE ID lubricant-accumulation-barrier portion 870a is about the same as the depth below the ABS 820 of the second TE OD lubricant-accumulation-barrier portion 870b. However, for the slider design of FIG. 8A, the plurality of lubricant-accumulation-barrier portions includes a lower lubricant-accumulation-barrier portion that has a depth of about 600 nm below the outer-most surface of the disk-facing side of the slider 800 and an upper lubricant-accumulation-barrier portion that has a depth between about 150 nm and about 600 nm below the outer-most surface of the disk-facing side of the slider 800. Specifically, as is next shown in FIG. 8B, the first lubricant-accumulation-barrier portion 860 serves as an lower lubricant-accumulation-barrier portion and has a depth about 600 nm below the outer-most surface of the disk-facing side of the slider 800; and, as is subsequently shown in FIG. 8C, the second lubricant-accumulation-barrier portion 870 serves as an upper lubricant-accumulation-barrier portion and has a depth of about 150 nm below the outer-most surface of the disk-facing side of the slider 800.

Figure 8B:
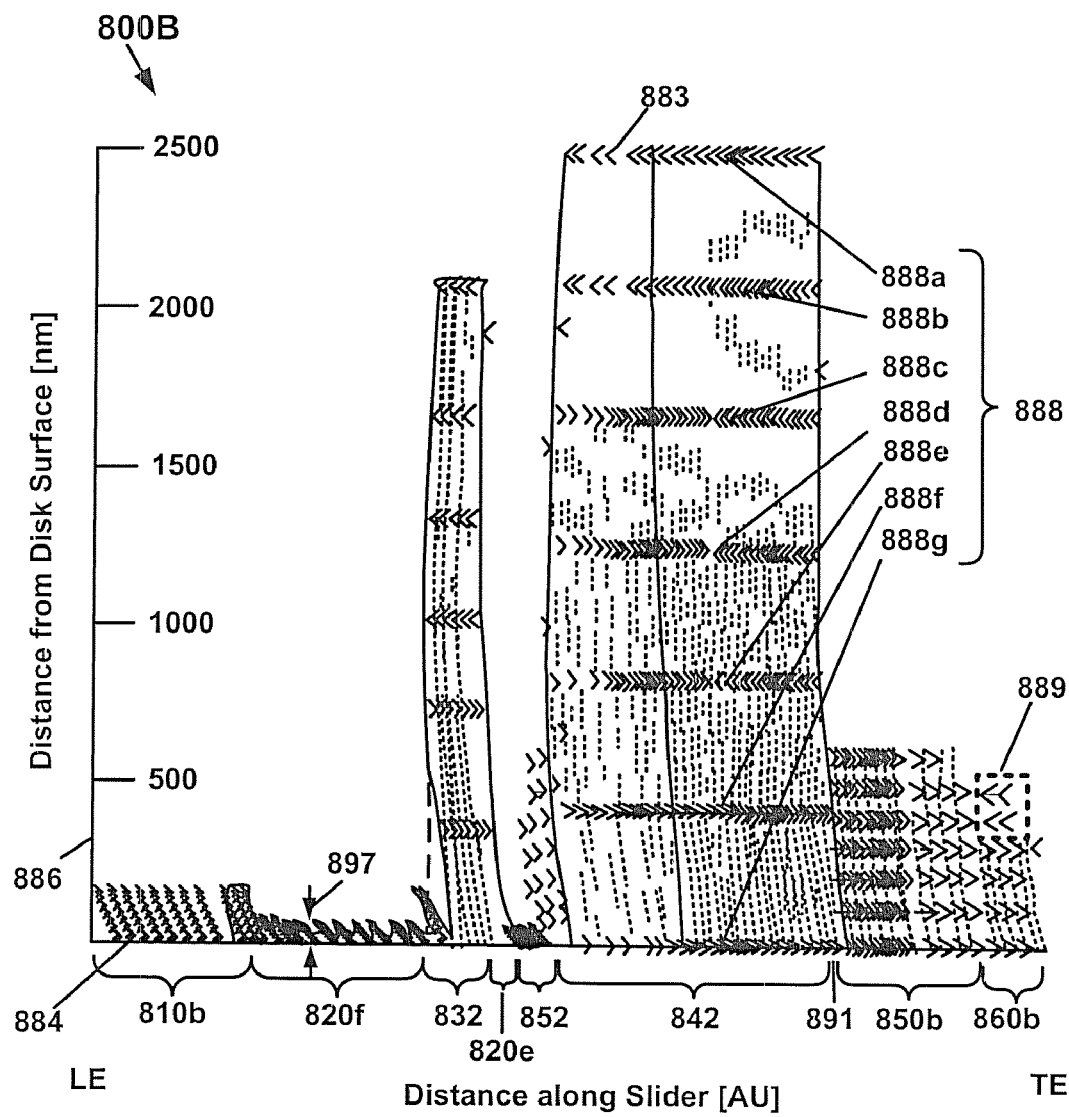
FIG. 8B is a vector-flow diagram through a vertical slice along line 8B-8B of FIG. 8A that is used to model an airflow pattern in a vertical air-column between the disk-facing slider-surface and a surface of a magnetic-recording disk in the simulation of airflow conditions that reduce lubricant accumulation at the shallow, TE etch pockets on the disk-facing slider-surface, in accordance with an embodiment of the present invention.

With reference now to FIG. 8B, in accordance with alternative embodiments of the present invention, a vector-flow diagram 800B through a vertical slice along line 8B-8B of FIG. 8A of the slider 800 is shown. FIG. 8B models an airflow pattern 888 in a vertical air-column between the disk-facing slider-surface of the slider 800 and a surface of the magnetic-recording disk. The results of the model are used to simulate airflow conditions that may lead to lubricant accumulation on the shallow, TE OD etch pocket 850b of the disk-facing slider-surface. The airflow pattern 888 in the vertical air-column between the disk-facing slider-surface and the surface of a magnetic-recording disk includes a plurality of airflow contours 888a-888g equally spaced between the disk-facing slider-surface and the surface of the magnetic-recording disk. The airflow contours 888a-888g are plotted as a function of abscissa 884 that is distance along the slider 800 in arbitrary units, similar to abscissa 394 of FIG. 3C. Thus, position along the slider 800 along line 8B-8B is given relative to the location of portions of the disk-facing slider-surface, given as follows starting from the LE and proceeding to the TE: the shallow, LE OD recess 810b; the LE OD pad 820f; the deep, OD channel 832; the OD, ABS-connecting portion 820e; the shallow, OD etch pocket 852; the deep, OD etch pocket 842; the shallow, TE OD etch pocket 850b; and, the first TE OD lubricant-accumulation-barrier portion 860b.

With further reference to FIG. 8B, ordinate 886, for which the airflow contours 888a-888g are plotted, is the distance of the airflow contour from the disk surface, which is the surface of the rotating magnetic-recording disk; the distance from the disk surface is given in units of nanometers (nm). As the distance between the disk-facing slider-surface and the surface of the rotating magnetic-recording disk varies with location of the vertical air-column over a particular portion of the disk-facing slider-surface, the distance of a given airflow contour from the disk surface varies with the location of the vertical air-column over a particular portion of the disk-facing slider-surface, because the airflow contours 888a-888g are equally spaced between the disk-facing slider-surface and the surface of the magnetic-recording disk. The distance along the ordinate is about equal to the depth below the outer-most surface of the disk-facing side differing only by the fly height of the slider 800 at the location of a given portion of the disk-facing side of the slider 800 used to label abscissa 884. For example, although not shown precisely to scale in FIG. 8B, the distance of portions of the disk-facing slider-surface from the surface of the magnetic-recording disk is about the same as the height of airflow contour 888a, which is greater than the depth of portions of the disk-facing slider-surface below the outer-most surface of the disk-facing side of the slider 800 by the fly height of the slider 800 at the location of a given portion. The depths of portions of the disk-facing slider-surface below the outer-most surface of the disk-facing side of the slider 800 are as follows: for the shallow, LE OD recess 810b, about 150 nm; the LE OD pad 820f, about 0 nm; the deep, OD channel 832, about 2500 nm; the OD, ABS-connecting portion 820e, about 0 nm; the shallow, OD etch pocket 852, about 800 nm; the deep, OD etch pocket 842, about 2500 nm; the shallow, TE OD etch pocket 850b, about 800 nm; the first TE OD lubricant-accumulation-barrier portion 860b, about 600 nm. A portion of the disk-facing slider-surface shown in FIG. 8A with the same gray-tone as a portion used to label abscissa 884 in FIG. 8B may have about the same depth below the outer-most surface of the disk-facing side of the slider 800 as the portion used to label abscissa 884.

For example, and with further reference to FIG. 8B, airflow contour 888a includes the plurality of directions of airflow for given points in close proximity to the disk-facing slider-surface; each direction of airflow for a given point in close proximity to the disk-facing slider-surface is given by each arrow-head of a component of an airflow vector directed along line 8B-8B of FIG. 8A at each point along the line 8B-8B. For example, arrowhead 883 is an arrow-head of a component of an airflow vector directed along line 8B-8B at a point located at about two thirds of the length of the deep, OD etch pocket 842 along the line 8B-8B in the direction of the LE from side-wall 891 between the shallow, TE OD etch pocket 850b and the deep, OD etch pocket 842. In this manner, airflow contour 888a gives the directions of airflow directed along the direction of line 8B-8B at the projection of each point along the line 8B-8B onto and in close proximity to the disk-facing slider-surface of the slider 800. Similarly, airflow contour 888g gives the directions of airflow directed along the direction of line 8B-8B at the projection of each point along the line 8B-8B onto and in close proximity to a surface of a rotating magnetic-recording disk. Airflow contours 888b-888f give the directions of airflow directed along the direction of line 8B-8B at points in the vertical air-column over each point along the line 8B-8B equally spaced between the disk-facing slider-surface and the surface of the magnetic-recording disk, respectively.

With further reference to FIG. 8B, in accordance with alternative embodiments of the present invention, the distance from the disk surface includes the fly height, which varies linearly decreasingly from about 100 nm at the LE to about 10 nm at the TE, and the distance the disk-facing slider-surface lies below a top datum surface of the slider 800, which is an outer-most surface of the disk-facing side of the slider 800. The fly height is defined as the separation distance between the ABS 820 and the disk surface; for example, the fly height at a point located at about one third of the way into the LE OD pad 820f of the ABS 820 along line 8B-8B in the direction proceeding from the LE towards the TE is designated by the pair of arrows 887. The distance that a portion of the disk-facing slider-surface lies below the ABS 820 is the distance from the disk surface of the portion of disk-facing slider-surface less the fly-height at the corresponding point of the line 8B-8B. For airflow contour 888a, this means that at the TE position along abscissa 884 the distance from the disk surface to the disk-facing slider-surface is about the same as the distance from the datum plane of the ABS 820 to the disk-facing slider-surface, being only about 10 nm more than the distance from the datum plane of the ABS 820.

With further reference to FIG. 8B, in accordance with alternative embodiments of the present invention, the results of the model simulate the airflow conditions that may lead to lubricant accumulation on the shallow, TE OD etch pocket 850b of the disk-facing slider-surface. At the TE over the first TE OD lubricant-accumulation-barrier portion 860b, the model predicts that there is located a region 889 of reduced, or negligible, reverse airflow, compared with the region 389 of reverse airflow over the slider 300 that produces lubricant accumulation 380, in the vertical air-column between the disk-facing slider-surface of the slider 800 and the surface of a magnetic-recording disk, as indicated by the limited number of arrow-heads of the airflow contours 888a-888b that point in the direction of the LE. Thus, the lubricant-accumulation barrier, including first lubricant-accumulation-barrier portion 860, as well as the component portions 860a and 860b of the first lubricant-accumulation-barrier portion 860, are configured to reduce reverse airflow over the lubricant-accumulation barrier, including the first lubricant-accumulation-barrier portion 860 and portions thereof 860a and 860b. In accordance with embodiments of the present invention, the first lubricant-accumulation-barrier portion 860 and individual first lubricant-accumulation-barrier portions 860a and 860b may have a depth between about 150 nm and about 600 nm below an outer-most surface of a disk-facing side of the slider 800. For example, the first lubricant-accumulation-barrier portions 860a and 860b are about 600 nm above the surface of the magnetic-recording disk; if the nominal fly height at the TE is taken into account, first lubricant-accumulation-barrier portions 860a and 860b have a depth about 590 nm below the ABS 820, which may be taken as the outer-most surface of the disk-facing side of the slider 800. As shown in FIG. 8A, the first lubricant-accumulation-barrier portion 860 is discontinuous from the OD side 804 of the slider 800 to the ID side 802 of the slider 800.

Figure 8C:
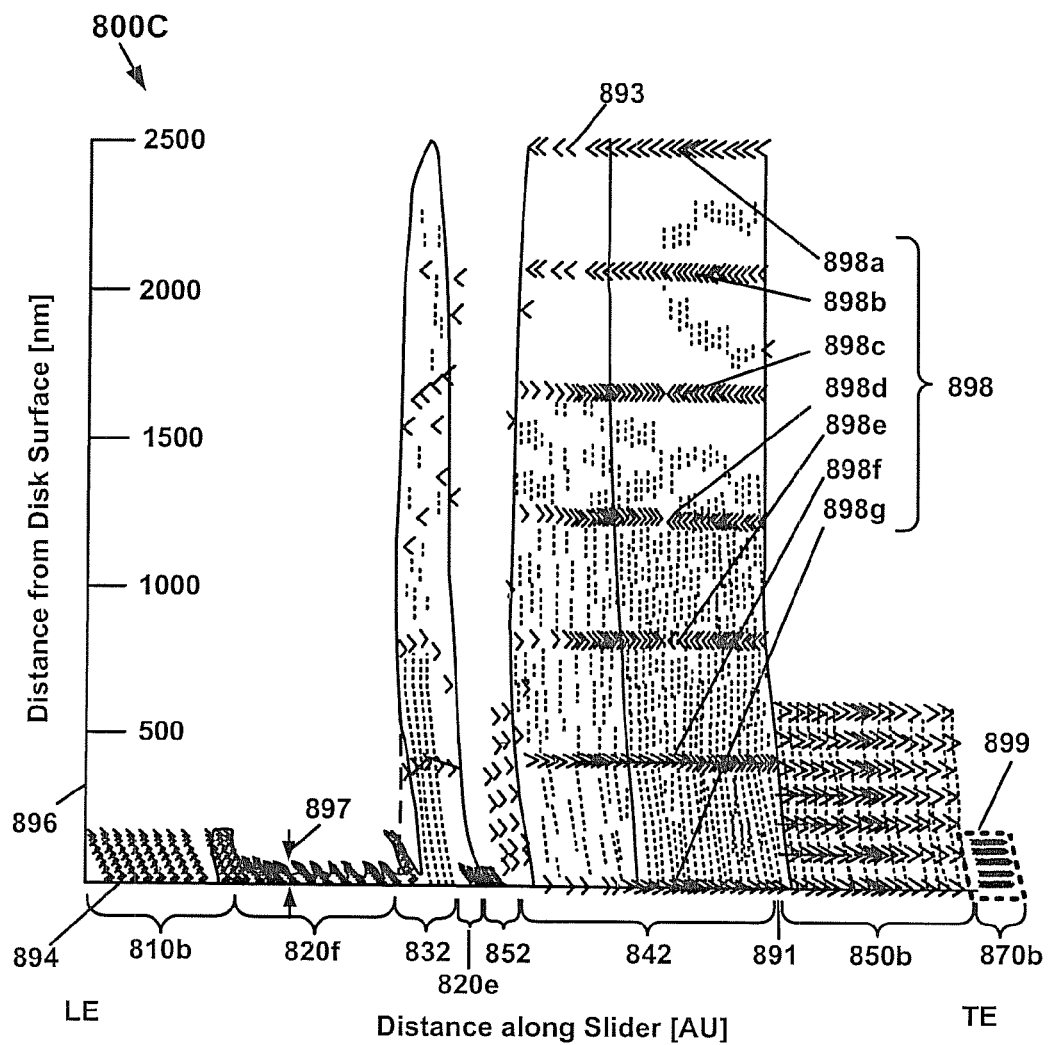
FIG. 8C is a vector-flow diagram through a vertical slice along line 8C-8C of FIG. 8A that is used to model an airflow pattern in a vertical air-column between the slider-surface of the slider and a surface of a magnetic-recording disk in the simulation of airflow conditions that reduce lubricant accumulation at the shallow, TE etch pockets on the disk-facing slider-surface, in accordance with an embodiment of the present invention.

With reference now to FIG. 8C, in accordance with alternative embodiments of the present invention, a vector-flow diagram 800C through a vertical slice along line 8C-8C of FIG. 8A of the slider 800 is shown. FIG. 8C models an airflow pattern 898 in a vertical air-column between the disk-facing slider-surface of the slider 800 and a surface of the magnetic-recording disk. The results of the model are used to simulate airflow conditions that may lead to lubricant accumulation on the shallow, TE OD etch pocket 850b of the disk-facing slider-surface. The airflow pattern 898 in the vertical air-column between the disk-facing slider-surface and the surface of a magnetic-recording disk includes a plurality of airflow contours 898a-898g equally spaced between the disk-facing slider-surface and the surface of the magnetic-recording disk. The airflow contours 898a-898g are plotted as a function of abscissa 894 that is distance along the slider 800 in arbitrary units, similar to abscissa 394 of FIG. 3C. Thus, position along the slider 800 along line 8C-8C is given relative to the location of portions of the disk-facing slider-surface, given as follows starting from the LE and proceeding to the TE: the shallow, LE OD recess 810b; the LE OD pad 820f; the deep, OD channel 832; the OD, ABS-connecting portion 820e; the shallow, OD etch pocket 852; the deep, OD etch pocket 842; the shallow, TE OD etch pocket 850b; and, the second TE OD lubricant-accumulation-barrier portion 870b.

With further reference to FIG. 8C, ordinate 896, similar to FIG. 8B, along which the airflow contours 898a-898g are plotted, is the distance of the airflow contour from the disk surface, which is the surface of the rotating magnetic-recording disk; the distance from the disk surface is given in units of nanometers (nm). As the distance between the disk-facing slider-surface and the surface of the rotating magnetic-recording disk varies with location of the vertical air-column over a particular portion of the disk-facing slider-surface, the distance of a given airflow contour from the disk surface varies with the location of the vertical air-column over a particular portion of the disk-facing slider-surface, because the airflow contours 898a-898g are equally spaced between the disk-facing slider-surface and the surface of the magnetic-recording disk. The distance along the ordinate is about equal to the depth below the outer-most surface of the disk-facing side differing only by the fly height of the slider 800 at the location of a given portion of the disk-facing side of the slider 800 used to label abscissa 894. For example, although not shown precisely to scale in FIG. 8C, the distance of portions of the disk-facing slider-surface from the surface of the magnetic-recording disk is about the same as the height of airflow contour 898a, which is greater than the depth of portions of the disk-facing slider-surface below the outer-most surface of the disk-facing side of the slider 800 by the fly height of the slider 800 at the location of a given portion. The depths of portions of the disk-facing slider-surface below the outer-most surface of the disk-facing side of the slider 800 are as follows: for the shallow, LE OD recess 810b, about 150 nm; the LE OD pad 820f, about 0 nm; the deep, OD channel 832, about 2500 nm; the OD, ABS-connecting portion 820e, about 0 nm; the shallow, OD etch pocket 852, about 800 nm; the deep, OD etch pocket 842, about 2500 nm; the shallow, TE OD etch pocket 850*b*, about 800 nm; and, the second TE OD lubricant-accumulation-barrier portion 870*b*, about 150 nm. A portion of the disk-facing slider-surface shown in FIG. 8A with the same gray-tone as a portion used to label abscissa 894 in FIG. 8C may have about the same depth below the outer-most surface of the disk-facing side of the slider 800 as the portion used to label abscissa 894.

For example, and with further reference to FIG. 8C, airflow contour 898*a* includes the plurality of directions of airflow for given points in close proximity to the disk-facing slider-surface; each direction of airflow for a given point in close proximity to the disk-facing slider-surface is given by each arrow-head of a component of an airflow vector directed along line 8C-8C of FIG. 8A at each point along the line 8C-8C. For example, arrow-head 893 is an arrow-head of a component of an airflow vector directed along line 8C-8C at a point located at about three quarters of the length of the deep, OD etch pocket 842 along the line 8C-8C in the direction of the LE from side-wall 891 between the shallow, TE OD etch pocket 850*b* and the deep, OD etch pocket 842. In this manner, airflow contour 898*a* gives the directions of airflow directed along the direction of line 8C-8C at the projection of each point along the line 8C-8C onto and in close proximity to the disk-facing slider-surface of the slider 800. Similarly, airflow contour 898*g* gives the directions of airflow directed along the direction of line 8C-8C at the projection of each point along the line 8C-8C onto and in close proximity to a surface of a rotating magnetic-recording disk. Airflow contours 898*b*-898*f* give the directions of airflow directed along the direction of line 8C-8C at points in the vertical air-column over each point along the line 8C-8C equally spaced between the disk-facing slider-surface and the surface of the magnetic-recording disk, respectively.

With further reference to FIG. 8C, in accordance with alternative embodiments of the present invention, the distance from the disk surface includes the fly height, which varies linearly decreasingly from about 100 nm at the LE to about 10 nm at the TE, and the distance the disk-facing slider-surface lies below a top datum surface of the slider 800, which is an outer-most surface of the disk-facing side of the slider 800, which may be defined at the ABS 820. The fly height is defined as the separation distance between the ABS 820 and the disk surface; for example, the fly height at a point located at about one third of the way into the LE OD pad 820*f* of the ABS 820 along line 8C-8C in the direction proceeding from the LE towards the TE is designated by the pair of arrows 897, similar to FIG. 8B. The distance that a portion of the disk-facing slider-surface lies below the ABS 820 is the distance from the disk surface of the portion of disk-facing slider-surface less the fly-height at the corresponding point of the line 8C-8C. For airflow contour 898*a*, this means that at the TE position along abscissa 894 the distance from the disk surface to the disk-facing slider-surface is about the same as the distance from the datum plane of the ABS 820 to the disk-facing slider-surface, being only about 10 nm more than the distance from the datum plane of the ABS 820.

With further reference to FIG. 8C, in accordance with alternative embodiments of the present invention, the results of the model simulate the airflow conditions that may lead to lubricant accumulation on the shallow, TE OD etch pocket 850*b* of the disk-facing slider-surface. At the TE over the first TE OD lubricant-accumulation-barrier portion 860*b*, the model predicts that there is located a region 899 of reduced, or negligible, reverse airflow, compared with the region 389 of reverse airflow over the slider 300 that produces lubricant accumulation 380, in the vertical air-column between the disk-facing slider-surface of the slider 800 and the surface of a magnetic-recording disk, as indicated by the numerous arrow-heads of the airflow contours 898*a*-898*g* that point in the direction of the TE. Thus, the lubricant-accumulation barrier, including second lubricant-accumulation-barrier portions 870, as well as the component portions 870*a* and 870*b* of the second lubricant-accumulation-barrier portion 870, are configured to reduce reverse airflow over the lubricant-accumulation barrier, including the second lubricant-accumulation-barrier portions 870 and portions thereof 870*a* and 870*b*. In accordance with embodiments of the present invention, the second lubricant-accumulation-barrier portion 870 and individual second lubricant-accumulation-barrier portions 870*a* and 870*b* may have a depth between about 150 nm and about 600 nm below an outer-most surface of a disk-facing side of the slider 800. For example, the second lubricant-accumulation-barrier portions 870*a* and 870*b* are about 150 nm above the surface of the magnetic-recording disk; if the nominal fly height at the TE is taken into account, second lubricant-accumulation-barrier portions 870*a* and 870*b* have a depth about 140 nm below the ABS 820, which may be taken as the outer-most surface of the disk-facing side of the slider 800. As shown in FIG. 8A, the first lubricant-accumulation-barrier portion 860 is discontinuous from the OD side 804 of the slider 800 to the ID side 802 of the slider 800. Similarly, the second lubricant-accumulation-barrier portion 870 is discontinuous from the OD side 804 of the slider 800 to the ID side 802 of the slider 800, having a gap wherein the first lubricant-accumulation-barrier portion 860 is located. For the slider design of FIG. 8A, the addition of both the first lubricant-accumulation-barrier portion 860 and the second lubricant-accumulation-barrier portion 870 to the slider 800 create a structure of "lube dams" that eliminates all reverse airflow on the TE portions of the slider 800 from the OD side 804 of the slider 800 to the end along the TE of the second TE OD lubricant-accumulation-barrier portion 870*b*, located, without limitation thereto, about midway between the TE center pad 820*a* and the OD side 804 of the slider 800. However, the TE portions located along the TE of the second TE OD lubricant-accumulation-barrier portion 870*b* still exhibit small reverse airflow as shown by region 889 of FIG. 8B.

A particular "lube dam" design may entail tradeoffs in: ABS flight characteristics of a slider, such as velocity sensitivity; write characteristics, such a self-servo writing; and, manufacturing costs, such as those associated with commonality of ABS design across various disk-rpm platforms; here rpm is an abbreviation for revolutions per minute. For example, continuous "lube dam" designs are prone to velocity sensitivity, which creates problems in the use of such designs for commonality across various disk-rpm platforms. Therefore, such continuous "lube dam" designs raise the cost of manufacturing HDDs having different disk-rpm. On the other hand, continuous "lube dam" designs are very effective in eliminating lubricant accumulation and the associated problems of increased SER, "jammies" and the unresponsiveness of a file during spin-up. The "lube dam" designs described above offer the HDD designer a variety of approaches for dealing with these problems.

Finally, embodiments of the present invention embrace the incorporation of sliders such as those described above in the environment of the HDD, and the environment of the HGA, which may be used in an HDD. Therefore, with reference to FIGS. 1 and 2, in accordance with embodiments of the present invention, a HDD 100 includes a magnetic-recording disk 120 rotatably mounted on a spindle 124, an arm 132 and a HGA 110 attached to the arm 132. The HGA 110 includes a magnetic-recording head 110*a* for writing data to and reading data from the magnetic-recording disk 120, and a load beam 110d attached at a gimbal portion of the load beam 110d to a slider 110b resistant to lubricant accumulation. The slider 110b includes the magnetic-recording head 110a that is integrally attached at a trailing-edge portion of the slider 110b. As described above for FIGS. 4A-8C, the slider 110b resistant to lubricant accumulation includes a positive-air-pressure portion of the slider 110b configured to levitate the slider 110b above a magnetic-recording disk 120, a negative-air-pressure portion of the slider 110b configured to bring the slider 110b into proximity with the magnetic-recording disk 120 at a fly height sufficient for writing data to and reading data from the magnetic-recording disk 120. As described above for FIGS. 4A-8C, the slider 110b resistant to lubricant accumulation further includes a lubricant-accumulation barrier disposed in proximity to a trailing edge of the slider 110b. As described above for FIGS. 4A-8C, the lubricant-accumulation barrier is configured to reduce lubricant accumulation on the slider. As described above at least for FIGS. 7A-8C, the lubricant-accumulation barrier may include a plurality of lubricant-accumulation-barrier portions disposed at a plurality of respective depths below an outer-most surface of a disk-facing side of the slider 110b.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A slider resistant to lubricant accumulation, comprising:
a positive-air-pressure portion of said slider configured to levitate said slider above a magnetic-recording disk;
a negative-air-pressure portion of said slider configured to bring said slider into proximity with said magnetic-recording disk at a fly height sufficient for writing data to and reading data from said magnetic-recording disk; and
a lubricant-accumulation barrier disposed in proximity to a trailing edge of said slider, wherein said lubricant-accumulation barrier is continuous with an outside diameter edge and an inside diameter edge of said slider and is discontinuous with respect to a trailing-edge center pad of an air-bearing surface said lubricant-accumulation barrier configured to reduce lubricant accumulation on said slider.

2. The slider resistant to lubricant accumulation recited in claim 1, wherein said lubricant-accumulation barrier is configured to reduce reverse airflow over said lubricant-accumulation barrier.

3. The slider resistant to lubricant accumulation recited in claim 1, wherein said lubricant-accumulation barrier is continuous from an outside-diameter side of said slider to an inside-diameter side of said slider.

4. The slider resistant to lubricant accumulation recited in claim 1, wherein said lubricant-accumulation barrier is discontinuous from an outside-diameter side of said slider to an inside-diameter side of said slider.

5. The slider resistant to lubricant accumulation recited in claim 1, wherein said lubricant-accumulation barrier further comprises:
a trailing-edge inside-diameter lubricant-accumulation-barrier portion; and
a trailing-edge outside-diameter lubricant-accumulation-barrier portion.

6. The slider resistant to lubricant accumulation recited in claim 5, wherein said trailing-edge inside-diameter lubricant-accumulation-barrier portion and said trailing-edge outside-diameter lubricant-accumulation-barrier portion are symmetrically disposed with respect to said trailing-edge center pad of said air-bearing surface.

7. The slider resistant to lubricant accumulation recited in claim 1, wherein lubricant-accumulation barrier has a depth between about 150 nm and about 600 nm below an outer-most surface of a disk-facing side of said slider.

8. A hard-disk drive comprising:
a magnetic-recording disk rotatably mounted on a spindle;
an arm; and
a head-gimbal assembly attached to said arm, said head-gimbal assembly comprising:
a magnetic-recording head for writing data to and reading data from said magnetic-recording disk; and
a load beam attached at a gimbal portion of said load beam to a slider resistant to lubricant accumulation, said slider including said magnetic-recording head integrally attached at a trailing-edge portion of said slider;
wherein said slider resistant to lubricant accumulation comprises:
a positive-air-pressure portion of said slider configured to levitate said slider above said magnetic-recording disk;
a negative-air-pressure portion of said slider configured to bring said slider into proximity with said magnetic-recording disk at a fly height sufficient for writing data to and reading data from said magnetic-recording disk; and
a lubricant-accumulation barrier disposed in proximity to a trailing edge of said slider, wherein said lubricant-accumulation barrier is continuous with an outside diameter edge and an inside diameter edge of said slider and is discontinuous with respect to a trailing-edge center pad of an air-bearing surface, said lubricant-accumulation barrier configured to reduce lubricant accumulation on said slider.

9. The hard-disk drive recited in claim 8, wherein said lubricant-accumulation barrier is configured to reduce reverse airflow over said lubricant-accumulation barrier.

10. The hard-disk drive recited in claim 8, wherein said lubricant-accumulation barrier is continuous from an outside-diameter side of said slider to an inside-diameter side of said slider.

11. The hard-disk drive recited in claim 8, wherein said lubricant-accumulation barrier is discontinuous from an outside-diameter side of said slider to an inside-diameter side of said slider.

12. The slider resistant to lubricant accumulation recited in claim 8, wherein said lubricant-accumulation barrier further comprises:
a trailing-edge inside-diameter lubricant-accumulation-barrier portion; and
a trailing-edge outside-diameter lubricant-accumulation-barrier portion.

13. The slider resistant to lubricant accumulation recited in claim 12, wherein said trailing-edge inside-diameter lubricant-accumulation-barrier portion and said trailing-edge outside-diameter lubricant-accumulation-barrier portion are symmetrically disposed with respect to said a trailing-edge center pad of said air-bearing surface.

14. The slider resistant to lubricant accumulation recited in claim 8, wherein lubricant-accumulation barrier has a depth between about 150 nm and about 600 nm below an outer-most surface of a disk-facing side of said slider.

15. A head-gimbal assembly, comprising:
   a magnetic-recording head configured for writing data to and reading data from a magnetic-recording disk; and
   a load beam attached at a gimbal portion of said load beam to a slider resistant to lubricant accumulation, said slider including said magnetic-recording head integrally attached at a trailing-edge portion of said slider;
wherein said slider resistant to lubricant accumulation comprises:
   a positive-air-pressure portion of said slider configured to levitate said slider above said magnetic-recording disk;
   a negative-air-pressure portion of said slider configured to bring said slider into proximity with said magnetic-recording disk at a fly height sufficient for writing data to and reading data from said magnetic-recording disk; and
   a lubricant-accumulation barrier disposed in proximity to a trailing edge of said slider, wherein said lubricant-accumulation barrier is continuous with an outside diameter edge and an inside diameter edge of said slider and is discontinuous with respect to a trailing-edge center pad of an air-bearing surface, said lubricant-accumulation barrier configured to reduce lubricant accumulation on said slider.

16. The head-gimbal assembly recited in claim 15, wherein said lubricant-accumulation barrier is configured to reduce reverse airflow over said lubricant-accumulation barrier.

17. The head-gimbal assembly recited in claim 15, wherein said lubricant-accumulation barrier is continuous from an outside-diameter side of said slider to an inside-diameter side of said slider.

18. The head-gimbal assembly recited in claim 15, wherein said lubricant-accumulation barrier is discontinuous from an outside-diameter side of said slider to an inside-diameter side of said slider.

19. The slider resistant to lubricant accumulation recited in claim 15, wherein said lubricant-accumulation barrier further comprises:
   a trailing-edge inside-diameter lubricant-accumulation-barrier portion; and
   a trailing-edge outside-diameter lubricant-accumulation-barrier portion.

20. The slider resistant to lubricant accumulation recited in claim 19, wherein said trailing-edge inside-diameter lubricant-accumulation-barrier portion and said trailing-edge outside-diameter lubricant-accumulation-barrier portion are symmetrically disposed with respect to said trailing-edge center pad of said air-bearing surface.

21. The slider resistant to lubricant accumulation recited in claim 15, wherein lubricant-accumulation barrier has a depth between about 150 nm and about 600 nm below an outer-most surface of a disk-facing side of said slider.

* * * * *